United States Patent
Xu et al.

(10) Patent No.: US 12,302,329 B2
(45) Date of Patent: May 13, 2025

(54) METHOD, DEVICE, AND SYSTEM FOR TRIGGERING SCHEDULING REQUEST

(71) Applicant: Huawei Technologies Co., Ltd., Shenzhen (CN)

(72) Inventors: Haibo Xu, Beijing (CN); Xiao Xiao, Shenzhen (CN); Jun Wang, Shanghai (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 17/421,241

(22) PCT Filed: Jan. 8, 2020

(86) PCT No.: PCT/CN2020/071009
§ 371 (c)(1),
(2) Date: Jul. 7, 2021

(87) PCT Pub. No.: WO2020/143693
PCT Pub. Date: Jul. 16, 2020

(65) Prior Publication Data
US 2022/0124772 A1    Apr. 21, 2022

(30) Foreign Application Priority Data

Jan. 8, 2019 (CN) .......................... 201910016842.9

(51) Int. Cl.
*H04W 72/21* (2023.01)
*H04W 4/40* (2018.01)
*H04W 72/542* (2023.01)

(52) U.S. Cl.
CPC ............. *H04W 72/21* (2023.01); *H04W 4/40* (2018.02); *H04W 72/542* (2023.01)

(58) Field of Classification Search
CPC ..... H04W 72/21; H04W 4/40; H04W 72/542; H04W 72/20; H04W 72/23; H04W 76/14; H04W 72/1268
See application file for complete search history.

(56) References Cited

U.S. PATENT DOCUMENTS

2015/0326484 A1   11/2015   Cao et al.
2017/0295559 A1*  10/2017   Agiwal ................. H04W 72/23
(Continued)

FOREIGN PATENT DOCUMENTS

CN    107277856 A   10/2017
CN    107333334 A   11/2017
(Continued)

OTHER PUBLICATIONS

3GPP TS 36.321 V13.5.0 "M3rd Generation Partnership Project; Technical Specification Group Radio Access Network; Evolved Universal Terrestrial Radio Access (E-UTRA); Medium Access Control (MAC) protocol specification (Release 13)," Mar. 2017, 93 pages.

*Primary Examiner* — Ayaz R Sheikh
*Assistant Examiner* — David Zhijun Sun
(74) *Attorney, Agent, or Firm* — Conley Rose, P.C.

(57) ABSTRACT

A method, a device, and a system for triggering a scheduling request (SR) to meet quality of service (QoS) requirements of different services in a New Radio (NR) vehicle to everything (V2X) system and to avoid or reduce unnecessary SR triggering. The method includes that a network device sends a first message to a terminal device, where the first message includes a first identifier and one or more configuration parameters corresponding to the first identifier. The first identifier is of a first logical channel, and the first logical channel is of a sidelink (SL) radio bearer. Alterna-
(Continued)

tively, there is a mapping relationship between the first identifier and the first logical channel.

20 Claims, 5 Drawing Sheets

(56) References Cited

U.S. PATENT DOCUMENTS

| | | | |
|---|---|---|---|
| 2018/0270700 A1 | 9/2018 | Babaei et al. | |
| 2018/0317123 A1* | 11/2018 | Chen | H04W 72/21 |
| 2018/0359766 A1 | 12/2018 | Shih | |
| 2018/0368133 A1 | 12/2018 | Park et al. | |
| 2018/0368173 A1* | 12/2018 | Shaheen | H04W 72/23 |
| 2020/0413429 A1* | 12/2020 | Tang | H04W 28/0268 |
| 2021/0298040 A1* | 9/2021 | Zhao | H04W 76/14 |

FOREIGN PATENT DOCUMENTS

| | | |
|---|---|---|
| CN | 107347215 A | 11/2017 |
| CN | 108811157 A | 11/2018 |
| EP | 3397015 A1 | 10/2018 |

* cited by examiner

METHOD, DEVICE, AND SYSTEM FOR TRIGGERING SCHEDULING REQUEST

TECHNICAL FIELD

This application relates to the field of communications technologies, and in particular, to a method, a device, and a system for triggering a scheduling request (scheduling request, SR).

BACKGROUND

In a long term evolution (long term evolution, LTE) system or a new radio (new radio, NR) system, a communications interface between a terminal device and a base station is referred to as a Uu interface. On the Uu interface, a link on which the terminal device sends data to the base station is referred to as an uplink (uplink, UL), and a link on which the terminal device receives data sent by the base station is referred to as a downlink (downlink, DL). In addition, a communications interface between terminal devices is referred to as a PC5 interface. A link for data transmission between terminal devices on the PC5 interface is referred to as a sidelink (sidelink, SL). The PC5 interface is generally used in a scenario in which direct communication can be performed between devices, such as vehicle to everything (vehicle to everything, V2X).

In an NR V2X system, unicast, multicast, and broadcast services need to be supported. In addition, different services have different delay requirements. For example, a delay requirement of some services is 3 ms, and a delay requirement of some services is 100 ms. If an SR is triggered according to an SR triggering mechanism for sidelink data in an LTE V2X system, some services having a high delay requirement cannot request a sidelink resource in time. Consequently, a transmission delay requirement of data of the services cannot be met.

SUMMARY

Embodiments of this application provide a method, a device, and a system for triggering an SR, to meet QoS requirements of different services in an NR V2X system, and to avoid or reduce unnecessary SR triggering.

To achieve the foregoing objective, the following technical solutions are used in the embodiments of this application.

According to a first aspect, a method for triggering a scheduling request SR is provided. The method includes: A terminal device receives a first message from a network device, where the first message includes a first identifier and one or more configuration parameters corresponding to the first identifier; the first identifier is an identifier of a first logical channel, or there is a mapping relationship between the first identifier and the first logical channel; and the first logical channel is a logical channel of a sidelink radio bearer; and if the first logical channel triggers a first regular sidelink buffer status report SL BSR and the first regular SL BSR has not been canceled, the terminal device triggers an SR based on the first identifier and the one or more configuration parameters corresponding to the first identifier. Based on the SR triggering mechanism, QoS requirements of different services in an NR V2X system can be met, and unnecessary SR triggering can be avoided or reduced.

With reference to the first aspect, in a possible design, if there is a mapping relationship between the first identifier and the identifier of the first logical channel, the first message further includes or indicates the mapping relationship between the first identifier and the identifier of the first logical channel. Further, the terminal device may learn of the mapping relationship between the first identifier and the identifier of the first logical channel.

With reference to the first aspect or the possible design of the first aspect, in a possible design, the first message further includes destination information, and the first identifier is associated with the destination information. The destination information is used to enable the terminal device to distinguish a destination to which the first identifier belongs, so as to trigger the SR based on the destination information, the first identifier, and the one or more configuration parameters corresponding to the first identifier.

With reference to the first aspect or the possible design of the first aspect, in a possible design, the first message further includes source information and destination information, the first identifier is associated with the source information, and the first identifier is associated with the destination information. The source information and the destination information are used to enable the terminal device to distinguish a combination of a source and a destination to which the first identifier belongs, so as to trigger the SR based on the combination of the source information and the destination information, the first identifier, and the one or more configuration parameters corresponding to the first identifier.

With reference to the first aspect or the possible design of the first aspect, in a possible design, the first identifier is the identifier of the first logical channel, and the one or more configuration parameters corresponding to the first identifier include one or more of the following parameters: a first parameter, where the first parameter is used to indicate a list of sidelink subcarrier spacings to which a sidelink SL media access control MAC service data unit SDU from the first logical channel can be mapped; a second parameter, where the second parameter is used to indicate a maximum duration for transmitting a physical sidelink shared channel PSSCH grant of the SL MAC SDU that is from the first logical channel; and a third parameter, where the third parameter is used to indicate whether the SR is allowed to be triggered when there is a first uplink grant for the first logical channel, and the first uplink grant is a configured uplink grant.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a second condition, where the second condition is that the terminal device has the first uplink grant, the third parameter corresponding to the identifier of the first logical channel exists, and a value of the third parameter indicates that the SR is allowed to be triggered when the first uplink grant is available for the first logical channel; and a third condition, where the third condition is that the terminal device has the second uplink grant, but the second uplink grant does not meet any one of the following conditions: condition a, where condition a is that the first parameter corresponding to the identifier of the first logical channel exists, but a subcarrier spacing associated with the second uplink grant is not included in a value set of the first parameter; and condition b, where condition b is that the second parameter corresponding to the identifier of the first logical channel exists, but a PUSCH duration associated with the second uplink grant is greater than a value of the second parameter. Based on the SR triggering mechanism, QoS requirements of different services in an NR V2X system can be met, and unnecessary SR triggering can be avoided or reduced.

With reference to the first aspect or the possible design of the first aspect, in a possible design, the first identifier is the identifier of the first logical channel, and the one or more configuration parameters corresponding to the first identifier include one or more of the following parameters: a fourth parameter, where the fourth parameter is used to indicate a list of uplink subcarrier spacings to which the first logical channel is mapped; a fifth parameter, where the fifth parameter is used to indicate a maximum duration of an uplink grant to which the first logical channel is mapped; and a third parameter, where the third parameter is used to indicate whether the SR is allowed to be triggered when there is a first uplink grant for the first logical channel, and the first uplink grant is a configured uplink grant.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a second condition, where the second condition is that the terminal device has the first uplink grant, the third parameter corresponding to the identifier of the first logical channel exists, and a value of the third parameter indicates that the SR is allowed to be triggered when the first uplink grant is available for the first logical channel; and a fourth condition, where the fourth condition is that the terminal device has the second uplink grant, but the second uplink grant does not meet any one of the following conditions: condition c, where condition c is that the fourth parameter corresponding to the identifier of the first logical channel exists, but a subcarrier spacing associated with the second uplink grant is not included in a value set of the fourth parameter; and condition d, where condition d is that the fifth parameter corresponding to the identifier of the first logical channel exists, but a PUSCH duration associated with the second uplink grant is greater than a value of the second parameter. Based on the SR triggering mechanism, QoS requirements of different services in an NR V2X system can be met, and unnecessary SR triggering can be avoided or reduced.

With reference to the first aspect or the possible design of the first aspect, in a possible design, the first identifier is the identifier of the first logical channel, and the one or more configuration parameters corresponding to the first identifier include one or more of the following parameters: a sixth parameter, where the sixth parameter is used to indicate an identifier of a second logical channel to which the first logical channel is mapped, and the second logical channel is a logical channel of an uplink radio bearer; and a third parameter, where the third parameter is used to indicate whether the SR is allowed to be triggered when there is a first uplink grant for the first logical channel, and the first uplink grant is a configured uplink grant.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a second condition, where the second condition is that the terminal device has the first uplink grant, the third parameter corresponding to the identifier of the first logical channel exists, and a value of the third parameter indicates that the SR is allowed to be triggered when the first uplink grant is available for the first logical channel; and a fifth condition, where the fifth condition is that the terminal device has the second uplink grant, and there is the sixth parameter corresponding to the identifier of the first logical channel, but the second uplink grant does not meet a logical channel prioritization LCP mapping restriction configured for the second logical channel to which the first logical channel is mapped. Based on the SR triggering mechanism, QoS requirements of different services in an NR V2X system can be met, and unnecessary SR triggering can be avoided or reduced.

With reference to the first aspect or the possible design of the first aspect, in a possible design, the first identifier is the identifier of the first logical channel, and the one or more configuration parameters corresponding to the first identifier include the following parameter: a seventh parameter, where the seventh parameter is used to indicate whether the SR is allowed to be triggered when there is a second uplink grant for the first logical channel, and the second uplink grant is an uplink grant used for new data transmission.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have the second uplink grant; and a sixth condition, where the sixth condition is that the terminal device has the second uplink grant, the seventh parameter corresponding to the identifier of the first logical channel exists, and a value of the seventh parameter indicates that the SR is allowed to be triggered when the second uplink grant is available for the first logical channel. Based on the SR triggering mechanism, QoS requirements of different services in an NR V2X system can be met, and unnecessary SR triggering can be avoided or reduced.

With reference to the first aspect or the possible design of the first aspect, in a possible design, the first identifier is the identifier of the first logical channel, and the one or more configuration parameters corresponding to the first identifier include the following parameter: an eighth parameter, where the eighth parameter is a first time threshold.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a seventh condition, where the seventh condition is that the terminal device has the second uplink grant, the eighth parameter corresponding to the first logical channel exists, and a value of the eighth parameter is less than a time interval between a moment at which the first logical channel triggers the first regular SL BSR and a moment at which the terminal device transmits an uplink MAC PDU including an SL BSR MAC CE next time. Based on the SR triggering mechanism, QoS requirements of different services in an NR V2X system can be met, and unnecessary SR triggering can be avoided or reduced.

With reference to the first aspect or the possible design of the first aspect, in a possible design, the first identifier is an identifier of a logical channel group to which the first logical channel belongs.

With reference to the first aspect or the possible design of the first aspect, in a possible design, the one or more configuration parameters corresponding to the first identifier include one or more of the following parameters: a ninth parameter, where the ninth parameter is used to indicate a list of sidelink subcarrier spacings to which an SL MAC SDU from a logical channel of a sidelink radio bearer included in the logical channel group can be mapped; a tenth parameter, where the tenth parameter is used to indicate a maximum duration of a PSSCH grant for transmitting an SL MAC SDU that is from a logical channel of a sidelink radio bearer included in the logical channel group; and an eleventh parameter, where the eleventh parameter is used to indicate whether the SR is allowed to be triggered when there is a first uplink grant for the logical channel of the sidelink radio bearer included in the logical channel group, and the first uplink grant is a configured uplink grant.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; an eighth condition, where the eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group; and a ninth condition, where the ninth condition is that the terminal device has the second uplink grant, but the second uplink grant does not meet any one of the following conditions: condition e, where condition e is that the ninth parameter corresponding to the identifier of the logical channel group to which the first logical channel belongs exists, but a subcarrier spacing associated with the second uplink grant is not included in a value set of the ninth parameter; and condition f, where condition f is that the tenth parameter corresponding to the identifier of the logical channel group to which the first logical channel belongs exists, but a PUSCH duration associated with the second uplink grant is greater than a value of the tenth parameter. Based on the SR triggering mechanism, QoS requirements of different services in an NR V2X system can be met, and unnecessary SR triggering can be avoided or reduced.

With reference to the first aspect or the possible design of the first aspect, in a possible design, the one or more configuration parameters corresponding to the first identifier include one or more of the following parameters: a twelfth parameter, where the twelfth parameter is used to indicate a list of uplink subcarrier spacings to which a logical channel of a sidelink radio bearer included in the logical channel group is mapped; a thirteenth parameter, where the thirteenth parameter is used to indicate a maximum duration of an uplink grant to which the logical channel of the sidelink radio bearer included in the logical channel group is mapped; and an eleventh parameter, where the eleventh parameter is used to indicate whether the SR is allowed to be triggered when there is a first uplink grant for the logical channel of the sidelink radio bearer included in the logical channel group, and the first uplink grant is a configured uplink grant.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; an eighth condition, where the eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group; and a tenth condition, where the tenth condition is that the terminal device has the second uplink grant, but the second uplink grant does not meet any one of the following conditions: condition g, where condition g is that the twelfth parameter corresponding to the identifier of the logical channel group to which the first logical channel belongs exists, but a subcarrier spacing associated with the second uplink grant is not included in a value set of the twelfth parameter; and condition h, where condition h is that the thirteenth parameter corresponding to the identifier of the logical channel group to which the first logical channel belongs exists, but a PUSCH duration associated with the second uplink grant is greater than a value of the thirteenth parameter. Based on the SR triggering mechanism, QoS requirements of different services in an NR V2X system can be met, and unnecessary SR triggering can be avoided or reduced.

With reference to the first aspect or the possible design of the first aspect, in a possible design, the one or more configuration parameters corresponding to the first identifier include one or more of the following parameters: a fourteenth parameter, where the fourteenth parameter is used to indicate an identifier of a logical channel of an uplink radio bearer to which a logical channel of a sidelink radio bearer included in the logical channel group is mapped; and an eleventh parameter, where the eleventh parameter is used to indicate whether the SR is allowed to be triggered when there is a first uplink grant for the logical channel of the sidelink radio bearer included in the logical channel group, and the first uplink grant is a configured uplink grant.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; an eighth condition, where the eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group; and an eleventh condition, where the eleventh condition is that the terminal device has the second uplink grant, and there is the fourteenth parameter corresponding to the identifier of the logical channel group to which the first logical channel belongs, but the second uplink grant does not meet an LCP mapping restriction configured for a logical channel of an uplink radio bearer to which the logical channel group including the first logical channel is mapped. Based on the SR triggering mechanism, QoS requirements of different services in an NR V2X system can be met, and unnecessary SR triggering can be avoided or reduced.

With reference to the first aspect or the possible design of the first aspect, in a possible design, the first identifier is the identifier of the first logical channel, and the one or more configuration parameters corresponding to the first identifier include the following parameter: a fifteenth parameter, where the fifteenth parameter is used to indicate whether the SR is allowed to be triggered when there is a second uplink grant for a logical channel of a sidelink radio bearer included in the logical channel group, and the second uplink grant is an uplink grant used for new data transmission.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have the second uplink grant; and a twelfth condition, where the twelfth condition is that the terminal device has the second uplink grant, the fifteenth parameter corresponding to the identifier of the logical channel group to which the first logical channel belongs exists, and a value of the fifteenth parameter indicates that the SR is allowed to be triggered when the second uplink grant is available for the logical channel of the sidelink radio bearer included in the logical channel group. Based on the SR triggering mechanism, QoS requirements of different services in an NR V2X system can be met, and unnecessary SR triggering can be avoided or reduced.

With reference to the first aspect or the possible design of the first aspect, in a possible design, the one or more configuration parameters corresponding to the first identifier include the following parameter: a sixteenth parameter, where the sixteenth parameter is a second time threshold.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; and a thirteenth condition, where the thirteenth condition is that the terminal device has the second uplink grant, the sixteenth parameter corresponding to the identifier of the logical channel group to which the first logical channel belongs exists, and a value of the sixteenth parameter is less than a time interval between a moment at which the first logical channel triggers the first regular SL BSR and a moment at which the terminal device transmits an uplink MAC PDU including an SL BSR MAC CE next time.

With reference to the first aspect or the possible design of the first aspect, in a possible design, the first identifier is an identifier of the sidelink radio bearer; the first identifier is an identifier of a quality of service QoS flow to which the sidelink radio bearer is mapped; or the first identifier is a QoS index of QoS information associated with the sidelink radio bearer.

With reference to the first aspect or the possible design of the first aspect, in a possible design, the one or more configuration parameters corresponding to the first identifier include one or more of the following parameters: a first parameter, where the first parameter is used to indicate a list of sidelink subcarrier spacings to which an SL MAC SDU from the first logical channel can be mapped; a second parameter, where the second parameter is used to indicate a maximum duration of a PSSCH grant for transmitting the SL MAC SDU that is from the first logical channel; and a third parameter, where the third parameter is used to indicate whether the SR is allowed to be triggered when there is a first uplink grant for the first logical channel, and the first uplink grant is a configured uplink grant.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a fourteenth condition, where the fourteenth condition is that the terminal device has the first uplink grant, the third parameter corresponding to the first identifier associated with the first logical channel exists, and a value of the third parameter indicates that the SR is allowed to be triggered when the first uplink grant is available for the first logical channel; and a fifteenth condition, where the fifteenth condition is that the terminal device has the second uplink grant, but the second uplink grant does not meet any one of the following conditions: condition i, where condition i is that the first parameter corresponding to the first identifier associated with the first logical channel exists, but a subcarrier spacing associated with the second uplink grant is not included in a value set of the first parameter; and condition j, where condition j is that the second parameter corresponding to the first identifier associated with the first logical channel exists, but a PUSCH duration associated with the second uplink grant is greater than a value of the second parameter. Based on the SR triggering mechanism, QoS requirements of different services in an NR V2X system can be met, and unnecessary SR triggering can be avoided or reduced.

With reference to the first aspect or the possible design of the first aspect, in a possible design, the one or more configuration parameters corresponding to the first identifier include one or more of the following parameters: a fourth parameter, where the fourth parameter is used to indicate a list of uplink subcarrier spacings to which the first logical channel is mapped; a fifth parameter, where the fifth parameter is used to indicate a maximum duration of an uplink grant to which the first logical channel is mapped; and a third parameter, where the third parameter is used to indicate whether the SR is allowed to be triggered when there is a first uplink grant for the first logical channel, and the first uplink grant is a configured uplink grant.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a fourteenth condition, where the fourteenth condition is that the terminal device has the first uplink grant, the third parameter corresponding to the first identifier associated with the first logical channel exists, and a value of the third parameter indicates that the SR is allowed to be triggered when the first uplink grant is available for the first logical channel; and a sixteenth condition, where the sixteenth condition is that the terminal device has the second uplink grant, but the second uplink grant does not meet any one of the following conditions: condition m, where condition m is that the fourth parameter corresponding to the first identifier associated with the first logical channel exists, but a subcarrier spacing associated with the second uplink grant is not included in a value set of the fourth parameter; and condition n, where condition n is that the fifth parameter corresponding to the first identifier associated with the first logical channel exists, but a PUSCH duration associated with the second uplink grant is greater than a value of the second parameter. Based on the SR triggering mechanism, QoS requirements of different services in an NR V2X system can be met, and unnecessary SR triggering can be avoided or reduced.

With reference to the first aspect or the possible design of the first aspect, in a possible design, the one or more configuration parameters corresponding to the first identifier include one or more of the following parameters: a sixth parameter, where the sixth parameter is used to indicate an identifier of a second logical channel to which the first logical channel is mapped, and the second logical channel is a logical channel of an uplink radio bearer; and a third parameter, where the third parameter is used to indicate whether the SR is allowed to be triggered when there is a first uplink grant for the first logical channel, and the first uplink grant is a configured uplink grant.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a fourteenth condition, where the fourteenth condition is that the terminal device has the first uplink grant, the third parameter corresponding to the first identifier associated with the first logical channel exists, and a value of the third parameter indicates that the SR is allowed to be triggered when the first uplink grant is available for the first logical channel; and a seventeenth condition, where the seventeenth condition is that the terminal device has the second uplink grant, and there is the sixth parameter corresponding to the first identifier associated with the first logical channel, but the second uplink grant does not meet an LCP mapping restriction configured for the second logical channel to which the first logical channel is mapped. Based on the SR triggering mechanism, QoS requirements of different services in an NR V2X system can be met, and unnecessary SR triggering can be avoided or reduced.

With reference to the first aspect or the possible design of the first aspect, in a possible design, the one or more configuration parameters corresponding to the first identifier include the following parameter: a seventh parameter, where the seventh parameter is used to indicate whether the SR is allowed to be triggered when there is a second uplink grant for the first logical channel, and the second uplink grant is an uplink grant used for new data transmission.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have the second uplink grant; and an eighteenth condition, where the eighteenth condition is that the terminal device has the second uplink grant, the seventh parameter corresponding to the first identifier associated with the first logical channel exists, and a value of the seventh parameter indicates that the SR is allowed to be triggered when the second uplink grant is available for the first logical channel. Based on the SR triggering mechanism, QoS requirements of different services in an NR V2X system can be met, and unnecessary SR triggering can be avoided or reduced.

With reference to the first aspect or the possible design of the first aspect, in a possible design, the one or more configuration parameters corresponding to the first identifier include the following parameter: an eighth parameter, where the eighth parameter is a first time threshold.

With reference to the first aspect or the possible design of the first aspect, in a possible design, that the terminal device triggers an SR based on the first identifier and the one or more configuration parameters corresponding to the first identifier includes: The terminal device triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; and a nineteenth condition, where the nineteenth condition is that the terminal device has the second uplink grant, the eighth parameter corresponding to the first identifier associated with the first logical channel exists, and a value of the eighth parameter is less than a time interval between a moment at which the first logical channel triggers the first regular SL BSR and a moment at which the terminal device transmits an uplink MAC PDU including an SL BSR MAC CE next time. Based on the SR triggering mechanism, QoS requirements of different services in an NR V2X system can be met, and unnecessary SR triggering can be avoided or reduced.

According to a second aspect, a terminal device is provided. The terminal device includes a processing module and a transceiver module. The transceiver module is configured to receive a first message from a network device, where the first message includes a first identifier and one or more configuration parameters corresponding to the first identifier; the first identifier is an identifier of a first logical channel, or there is a mapping relationship between the first identifier and the first logical channel; and the first logical channel is a logical channel of a sidelink radio bearer. The processing module is configured to: if the first logical channel triggers a first regular sidelink buffer status report SL BSR and the first regular SL BSR has not been canceled, trigger an SR based on the first identifier and the one or more configuration parameters corresponding to the first identifier.

With reference to the second aspect, in a possible design, if there is a mapping relationship between the first identifier and the identifier of the first logical channel, the first message further includes or indicates the mapping relationship between the first identifier and the identifier of the first logical channel.

With reference to the second aspect or the possible design of the second aspect, in a possible design, the first message further includes destination information, and the first identifier is associated with the destination information.

With reference to the second aspect or the possible design of the second aspect, in a possible design, the first message further includes source information and destination information, the first identifier is associated with the source information, and the first identifier is associated with the destination information.

With reference to the second aspect or the possible design of the second aspect, in a possible design, the first identifier is the identifier of the first logical channel, and the one or more configuration parameters corresponding to the first identifier include one or more of the following parameters: a first parameter, where the first parameter is used to indicate a list of sidelink subcarrier spacings to which a sidelink SL media access control MAC service data unit SDU from the first logical channel can be mapped; a second parameter, where the second parameter is used to indicate a maximum duration for transmitting a physical sidelink shared channel PSSCH grant of the SL MAC SDU that is from the first logical channel; and a third parameter, where the third parameter is used to indicate whether the SR is allowed to be triggered when there is a first uplink grant for the first logical channel, and the first uplink grant is a configured uplink grant.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a second condition, where the second condition is that the terminal device has the first uplink grant, the third parameter corresponding to the identifier of the first logical channel exists, and a value of the third parameter indicates that the SR is allowed to be triggered when the first uplink grant is available for the first logical channel; and a third condition, where the third condition is that the terminal device has the second uplink grant, but the second uplink grant does not meet any one of the following conditions: condition a, where condition a is that the first parameter corresponding to the identifier of the first logical channel exists, but a subcarrier spacing associated with the second uplink grant is not included in a value set of the first parameter; and condition b, where condition b is that the second parameter corresponding to the identifier of the first logical channel exists, but a PUSCH duration associated with the second uplink grant is greater than a value of the second parameter.

With reference to the second aspect or the possible design of the second aspect, in a possible design, the first identifier is the identifier of the first logical channel, and the one or more configuration parameters corresponding to the first identifier include one or more of the following parameters: a fourth parameter, where the fourth parameter is used to indicate a list of uplink subcarrier spacings to which the first logical channel is mapped; a fifth parameter, where the fifth parameter is used to indicate a maximum duration of an uplink grant to which the first logical channel is mapped; and a third parameter, where the third parameter is used to indicate whether the SR is allowed to be triggered when there is a first uplink grant for the first logical channel, and the first uplink grant is a configured uplink grant.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a second condition, where the second condition is that the terminal device has the first uplink grant, the third parameter corresponding to the identifier of the first logical channel exists, and a value of the third parameter indicates that the SR is allowed to be triggered when the first uplink grant is available for the first logical channel; and a fourth condition, where the fourth condition is that the terminal device has the second uplink grant, but the second uplink grant does not meet any one of the following conditions: condition c, where condition c is that the fourth parameter corresponding to the identifier of the first logical channel exists, but a subcarrier spacing associated with the second uplink grant is not included in a value set of the fourth parameter; and condition d, where condition d is that the fifth parameter corresponding to the identifier of the first logical channel exists, but a PUSCH duration associated with the second uplink grant is greater than a value of the second parameter.

With reference to the second aspect or the possible design of the second aspect, in a possible design, the first identifier is the identifier of the first logical channel, and the one or more configuration parameters corresponding to the first identifier include one or more of the following parameters: a sixth parameter, where the sixth parameter is used to indicate an identifier of a second logical channel to which the first logical channel is mapped, and the second logical channel is a logical channel of an uplink radio bearer; and a third parameter, where the third parameter is used to indicate whether the SR is allowed to be triggered when there is a first uplink grant for the first logical channel, and the first uplink grant is a configured uplink grant.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a second condition, where the second condition is that the terminal device has the first uplink grant, the third parameter corresponding to the identifier of the first logical channel exists, and a value of the third parameter indicates that the SR is allowed to be triggered when the first uplink grant is available for the first logical channel; and a fifth condition, where the fifth condition is that the terminal device has the second uplink grant, and there is the sixth parameter corresponding to the identifier of the first logical channel, but the second uplink grant does not meet a logical channel prioritization LCP mapping restriction configured for the second logical channel to which the first logical channel is mapped.

With reference to the second aspect or the possible design of the second aspect, in a possible design, the first identifier is the identifier of the first logical channel, and the one or more configuration parameters corresponding to the first identifier include the following parameter: a seventh parameter, where the seventh parameter is used to indicate whether the SR is allowed to be triggered when there is a second uplink grant for the first logical channel, and the second uplink grant is an uplink grant used for new data transmission.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have the second uplink grant; and a sixth condition, where the sixth condition is that the terminal device has the second uplink grant, the seventh parameter corresponding to the identifier of the first logical channel exists, and a value of the seventh parameter indicates that the SR is allowed to be triggered when the second uplink grant is available for the first logical channel.

With reference to the second aspect or the possible design of the second aspect, in a possible design, the first identifier is the identifier of the first logical channel, and the one or more configuration parameters corresponding to the first identifier include the following parameter: an eighth parameter, where the eighth parameter is a first time threshold.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a seventh condition, where the seventh condition is that the terminal device has the second uplink grant, the eighth parameter corresponding to the first logical channel exists, and a value of the eighth parameter is less than a time interval between a moment at which the first logical channel triggers the first regular SL BSR and a moment at which the terminal device transmits an uplink MAC PDU including an SL BSR MAC CE next time.

With reference to the second aspect or the possible design of the second aspect, in a possible design, the first identifier is an identifier of a logical channel group to which the first logical channel belongs.

With reference to the second aspect or the possible design of the second aspect, in a possible design, the one or more configuration parameters corresponding to the first identifier include one or more of the following parameters: a ninth parameter, where the ninth parameter is used to indicate a list of sidelink subcarrier spacings to which an SL MAC SDU from a logical channel of a sidelink radio bearer included in the logical channel group can be mapped; a tenth parameter, where the tenth parameter is used to indicate a maximum duration of a PSSCH grant for transmitting an SL MAC SDU that is from a logical channel of a sidelink radio bearer included in the logical channel group; and an eleventh parameter, where the eleventh parameter is used to indicate whether the SR is allowed to be triggered when there is a first uplink grant for the logical channel of the sidelink radio bearer included in the logical channel group, and the first uplink grant is a configured uplink grant.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; an eighth condition, where the eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group; and a ninth condition, where the ninth condition is that the terminal device has the second uplink grant, but the second uplink grant does not meet any one of the following conditions: condition e, where condition e is that the ninth parameter corresponding to the identifier of the logical channel group to which the first logical channel belongs exists, but a subcarrier spacing associated with the second uplink grant is not included in a value set of the ninth parameter; and condition f, where condition f is that the tenth parameter corresponding to the identifier of the logical channel group to which the first logical channel belongs exists, but a PUSCH duration associated with the second uplink grant is greater than a value of the tenth parameter.

With reference to the second aspect or the possible design of the second aspect, in a possible design, the one or more configuration parameters corresponding to the first identifier include one or more of the following parameters: a twelfth parameter, where the twelfth parameter is used to indicate a list of uplink subcarrier spacings to which a logical channel of a sidelink radio bearer included in the logical channel group is mapped; a thirteenth parameter, where the thirteenth parameter is used to indicate a maximum duration of an uplink grant to which the logical channel of the sidelink radio bearer included in the logical channel group is mapped; and an eleventh parameter, where the eleventh parameter is used to indicate whether the SR is allowed to be triggered when there is a first uplink grant for the logical channel of the sidelink radio bearer included in the logical channel group, and the first uplink grant is a configured uplink grant.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; an eighth condition, where the eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group; and a tenth condition, where the tenth condition is that the terminal device has the second uplink grant, but the second uplink grant does not meet any one of the following conditions: condition g, where condition g is that the twelfth parameter corresponding to the identifier of the logical channel group to which the first logical channel belongs exists, but a subcarrier spacing associated with the second uplink grant is not included in a value set of the twelfth parameter; and condition h, where condition h is that the thirteenth parameter corresponding to the identifier of the logical channel group to which the first logical channel belongs exists, but a PUSCH duration associated with the second uplink grant is greater than a value of the thirteenth parameter.

With reference to the second aspect or the possible design of the second aspect, in a possible design, the one or more configuration parameters corresponding to the first identifier include one or more of the following parameters: a fourteenth parameter, where the fourteenth parameter is used to indicate an identifier of a logical channel of an uplink radio bearer to which a logical channel of a sidelink radio bearer included in the logical channel group is mapped; and an eleventh parameter, where the eleventh parameter is used to indicate whether the SR is allowed to be triggered when there is a first uplink grant for the logical channel of the sidelink radio bearer included in the logical channel group, and the first uplink grant is a configured uplink grant.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; an eighth condition, where the eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group; and an eleventh condition, where the eleventh condition is that the terminal device has the second uplink grant, and there is the fourteenth parameter corresponding to the identifier of the logical channel group to which the first logical channel belongs, but the second uplink grant does not meet an LCP mapping restriction configured for a logical channel of an uplink radio bearer to which the logical channel group including the first logical channel is mapped.

With reference to the second aspect or the possible design of the second aspect, in a possible design, the one or more configuration parameters corresponding to the first identifier include the following parameter: a fifteenth parameter, where the fifteenth parameter is used to indicate whether the SR is allowed to be triggered when there is a second uplink grant for a logical channel of a sidelink radio bearer included in the logical channel group, and the second uplink grant is an uplink grant used for new data transmission.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have the second uplink grant; and a twelfth condition, where the twelfth condition is that the terminal device has the second uplink grant, the fifteenth parameter corresponding to the identifier of the logical channel group to which the first logical channel belongs exists, and a value of the fifteenth parameter indicates that the SR is allowed to be triggered when the second uplink grant is available for the logical channel of the sidelink radio bearer included in the logical channel group.

With reference to the second aspect or the possible design of the second aspect, in a possible design, the one or more configuration parameters corresponding to the first identifier include the following parameter: a sixteenth parameter, where the sixteenth parameter is a second time threshold.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; and a thirteenth condition, where the thirteenth condition is that the terminal device has the second uplink grant, the sixteenth parameter corresponding to the identifier of the logical channel group to which the first logical channel belongs exists, and a value of the sixteenth parameter is less than a time interval between a moment at which the first logical channel triggers the first regular SL BSR and a moment at which the terminal device transmits an uplink MAC PDU including an SL BSR MAC CE next time.

With reference to the second aspect or the possible design of the second aspect, in a possible design, the first identifier is an identifier of the sidelink radio bearer; the first identifier is an identifier of a quality of service QoS flow to which the sidelink radio bearer is mapped; or the first identifier is a QoS index of QoS information associated with the sidelink radio bearer.

With reference to the second aspect or the possible design of the second aspect, in a possible design, the one or more configuration parameters corresponding to the first identifier include one or more of the following parameters: a first parameter, where the first parameter is used to indicate a list of sidelink subcarrier spacings to which an SL MAC SDU from the first logical channel can be mapped; a second parameter, where the second parameter is used to indicate a maximum duration of a PSSCH grant for transmitting the SL MAC SDU that is from the first logical channel; and a third parameter, where the third parameter is used to indicate whether the SR is allowed to be triggered when there is a first uplink grant for the first logical channel, and the first uplink grant is a configured uplink grant.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a fourteenth condition, where the fourteenth condition is that the terminal device has the first uplink grant, the third parameter corresponding to the first identifier associated with the first logical channel exists, and a value of the third parameter indicates that the SR is allowed to be triggered when the first uplink grant is available for the first logical channel; and a fifteenth condition, where the fifteenth condition is that the terminal device has the second uplink grant, but the second uplink grant does not meet any one of the following conditions: condition i, where condition i is that the first parameter corresponding to the first identifier associated with the first logical channel exists, but a subcarrier spacing associated with the second uplink grant is not included in a value set of the first parameter; and condition j, where condition j is that the second parameter corresponding to the first identifier associated with the first logical channel exists, but a PUSCH duration associated with the second uplink grant is greater than a value of the second parameter.

With reference to the second aspect or the possible design of the second aspect, in a possible design, the one or more configuration parameters corresponding to the first identifier include one or more of the following parameters: a fourth parameter, where the fourth parameter is used to indicate a list of uplink subcarrier spacings to which the first logical channel is mapped; a fifth parameter, where the fifth parameter is used to indicate a maximum duration of an uplink grant to which the first logical channel is mapped; and a third parameter, where the third parameter is used to indicate whether the SR is allowed to be triggered when there is a first uplink grant for the first logical channel, and the first uplink grant is a configured uplink grant.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a fourteenth condition, where the fourteenth condition is that the terminal device has the first uplink grant, the third parameter corresponding to the first identifier associated with the first logical channel exists, and a value of the third parameter indicates that the SR is allowed to be triggered when the first uplink grant is available for the first logical channel; and a sixteenth condition, where the sixteenth condition is that the terminal device has the second uplink grant, but the second uplink grant does not meet any one of the following conditions: condition m, where condition m is that the fourth parameter corresponding to the first identifier associated with the first logical channel exists, but a subcarrier spacing associated with the second uplink grant is not included in a value set of the fourth parameter; and condition n, where condition n is that the fifth parameter corresponding to the first identifier associated with the first logical channel exists, but a PUSCH duration associated with the second uplink grant is greater than a value of the second parameter.

With reference to the second aspect or the possible design of the second aspect, in a possible design, the one or more configuration parameters corresponding to the first identifier include one or more of the following parameters: a sixth parameter, where the sixth parameter is used to indicate an identifier of a second logical channel to which the first logical channel is mapped, and the second logical channel is a logical channel of an uplink radio bearer; and a third parameter, where the third parameter is used to indicate whether the SR is allowed to be triggered when there is a first uplink grant for the first logical channel, and the first uplink grant is a configured uplink grant.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a fourteenth condition, where the fourteenth condition is that the terminal device has the first uplink grant, the third parameter corresponding to the first identifier associated with the first logical channel exists, and a value of the third parameter indicates that the SR is allowed to be triggered when the first uplink grant is available for the first logical channel; and a seventeenth condition, where the seventeenth condition is that the terminal device has the second uplink grant, and there is the sixth parameter corresponding to the first identifier associated with the first logical channel, but the second uplink grant does not meet an LCP mapping restriction configured for the second logical channel to which the first logical channel is mapped.

With reference to the second aspect or the possible design of the second aspect, in a possible design, the one or more configuration parameters corresponding to the first identifier include the following parameter: a seventh parameter, where the seventh parameter is used to indicate whether the SR is allowed to be triggered when there is a second uplink grant for the first logical channel, and the second uplink grant is an uplink grant used for new data transmission.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have the second uplink grant; and an eighteenth condition, where the eighteenth condition is that the terminal device has the second uplink grant, the seventh parameter corresponding to the first identifier associated with the first logical channel exists, and a value of the seventh parameter indicates that the SR is allowed to be triggered when the second uplink grant is available for the first logical channel.

With reference to the second aspect or the possible design of the second aspect, in a possible design, the one or more configuration parameters corresponding to the first identifier include the following parameter: an eighth parameter, where the eighth parameter is a first time threshold.

With reference to the second aspect or the possible design of the second aspect, in a possible design, that the processing module is configured to trigger an SR based on the first identifier and the one or more configuration parameters corresponding to the first identifier includes: The processing module is configured to trigger the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; and a nineteenth condition, where the nineteenth condition is that the terminal device has the second uplink grant, the eighth parameter corresponding to the first identifier associated with the first logical channel exists, and a value of the eighth parameter is less than a time interval between a moment at which the first logical channel triggers the first regular SL BSR and a moment at which the terminal device transmits an uplink MAC PDU including an SL BSR MAC CE next time.

For a technical effect of the second aspect, refer to the technical effect of the first aspect. Details are not described herein.

According to a third aspect, a terminal device is provided. The terminal device includes a processor and a communications interface, and the processor performs communication connection by using the communications interface. The processor receives a first message from a network device through the communications interface. The first message includes a first identifier and one or more configuration parameters corresponding to the first identifier, where the first identifier is an identifier of a first logical channel, or there is a mapping relationship between the first identifier and the first logical channel. The first logical channel is a logical channel of a sidelink radio bearer. Further, if the first logical channel triggers a first regular sidelink buffer status report SL BSR and the first regular SL BSR has not been canceled, the processor triggers an SR based on the first identifier and the one or more configuration parameters corresponding to the first identifier. With reference to the third aspect, in a possible design, if there is a mapping relationship between the first identifier and the identifier of the first logical channel, the first message further includes or indicates the mapping relationship between the first identifier and the identifier of the first logical channel.

With reference to the third aspect or the possible design of the third aspect, in a possible design, the first message further includes destination information, and the first identifier is associated with the destination information.

With reference to the third aspect or the possible design of the third aspect, in a possible design, the first message further includes source information and destination information, the first identifier is associated with the source information, and the first identifier is associated with the destination information.

With reference to the third aspect or the possible design of the third aspect, in a possible design, the first identifier is the identifier of the first logical channel, and the one or more configuration parameters corresponding to the first identifier include one or more of the following parameters: a first parameter, where the first parameter is used to indicate a list of sidelink subcarrier spacings to which a sidelink SL media access control MAC service data unit SDU from the first logical channel can be mapped; a second parameter, where the second parameter is used to indicate a maximum duration for transmitting a physical sidelink shared channel PSSCH grant of the SL MAC SDU that is from the first logical channel; and a third parameter, where the third parameter is used to indicate whether the SR is allowed to be triggered when there is a first uplink grant for the first logical channel, and the first uplink grant is a configured uplink grant.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a second condition, where the second condition is that the terminal device has the first uplink grant, the third parameter corresponding to the identifier of the first logical channel exists, and a value of the third parameter indicates that the SR is allowed to be triggered when the first uplink grant is available for the first logical channel; and a third condition, where the third condition is that the terminal device has the second uplink grant, but the second uplink grant does not meet any one of the following conditions: condition a, where condition a is that the first parameter corresponding to the identifier of the first logical channel exists, but a subcarrier spacing associated with the second uplink grant is not included in a value set of the first parameter; and condition b, where condition b is that the second parameter corresponding to the identifier of the first logical channel exists, but a PUSCH duration associated with the second uplink grant is greater than a value of the second parameter.

With reference to the third aspect or the possible design of the third aspect, in a possible design, the first identifier is the identifier of the first logical channel, and the one or more configuration parameters corresponding to the first identifier include one or more of the following parameters: a fourth parameter, where the fourth parameter is used to indicate a list of uplink subcarrier spacings to which the first logical channel is mapped; a fifth parameter, where the fifth parameter is used to indicate a maximum duration of an uplink grant to which the first logical channel is mapped; and a third parameter, where the third parameter is used to indicate whether the SR is allowed to be triggered when there is a first uplink grant for the first logical channel, and the first uplink grant is a configured uplink grant.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a second condition, where the second condition is that the terminal device has the first uplink grant, the third parameter corresponding to the identifier of the first logical channel exists, and a value of the third parameter indicates that the SR is allowed to be triggered when the first uplink grant is available for the first logical channel; and a fourth condition, where the fourth condition is that the terminal device has the second uplink grant, but the second uplink grant does not meet any one of the following conditions: condition c, where condition c is that the fourth parameter corresponding to the identifier of the first logical channel exists, but a subcarrier spacing associated with the second uplink grant is not included in a value set of the fourth parameter; and condition d, where condition d is that the fifth parameter corresponding to the identifier of the first logical channel exists, but a PUSCH duration associated with the second uplink grant is greater than a value of the second parameter.

With reference to the third aspect or the possible design of the third aspect, in a possible design, the first identifier is the identifier of the first logical channel, and the one or more configuration parameters corresponding to the first identifier include one or more of the following parameters: a sixth parameter, where the sixth parameter is used to indicate an identifier of a second logical channel to which the first logical channel is mapped, and the second logical channel is a logical channel of an uplink radio bearer; and a third parameter, where the third parameter is used to indicate whether the SR is allowed to be triggered when there is a first uplink grant for the first logical channel, and the first uplink grant is a configured uplink grant.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a second condition, where the second condition is that the terminal device has the first uplink grant, the third parameter corresponding to the identifier of the first logical channel exists, and a value of the third parameter indicates that the SR is allowed to be triggered when the first uplink grant is available for the first logical channel; and a fifth condition, where the fifth condition is that the terminal device has the second uplink grant, and there is the sixth parameter corresponding to the identifier of the first logical channel, but the second uplink grant does not meet a logical channel prioritization LCP mapping restriction configured for the second logical channel to which the first logical channel is mapped.

With reference to the third aspect or the possible design of the third aspect, in a possible design, the first identifier is the identifier of the first logical channel, and the one or more configuration parameters corresponding to the first identifier include the following parameter: a seventh parameter, where the seventh parameter is used to indicate whether the SR is allowed to be triggered when there is a second uplink grant for the first logical channel, and the second uplink grant is an uplink grant used for new data transmission.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have the second uplink grant; and a sixth condition, where the sixth condition is that the terminal device has the second uplink grant, the seventh parameter corresponding to the identifier of the first logical channel exists, and a value of the seventh parameter indicates that the SR is allowed to be triggered when the second uplink grant is available for the first logical channel.

With reference to the third aspect or the possible design of the third aspect, in a possible design, the first identifier is the identifier of the first logical channel, and the one or more configuration parameters corresponding to the first identifier include the following parameter: an eighth parameter, where the eighth parameter is a first time threshold.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a seventh condition, where the seventh condition is that the terminal device has the second uplink grant, the eighth parameter corresponding to the first logical channel exists, and a value of the eighth parameter is less than a time interval between a moment at which the first logical channel triggers the first regular SL BSR and a moment at which the terminal device transmits an uplink MAC PDU including an SL BSR MAC CE next time.

With reference to the third aspect or the possible design of the third aspect, in a possible design, the first identifier is an identifier of a logical channel group to which the first logical channel belongs.

With reference to the third aspect or the possible design of the third aspect, in a possible design, the one or more configuration parameters corresponding to the first identifier include one or more of the following parameters: a ninth parameter, where the ninth parameter is used to indicate a list of sidelink subcarrier spacings to which an SL MAC SDU from a logical channel of a sidelink radio bearer included in the logical channel group can be mapped; a tenth parameter, where the tenth parameter is used to indicate a maximum duration of a PSSCH grant for transmitting an SL MAC SDU that is from a logical channel of a sidelink radio bearer included in the logical channel group; and an eleventh parameter, where the eleventh parameter is used to indicate whether the SR is allowed to be triggered when there is a first uplink grant for the logical channel of the sidelink radio bearer included in the logical channel group, and the first uplink grant is a configured uplink grant.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; an eighth condition, where the eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group; and a ninth condition, where the ninth condition is that the terminal device has the second uplink grant, but the second uplink grant does not meet any one of the following conditions: condition e, where condition e is that the ninth parameter corresponding to the identifier of the logical channel group to which the first logical channel belongs exists, but a subcarrier spacing associated with the second uplink grant is not included in a value set of the ninth parameter; and condition f, where condition f is that the tenth parameter corresponding to the identifier of the logical channel group to which the first logical channel belongs exists, but a PUSCH duration associated with the second uplink grant is greater than a value of the tenth parameter.

With reference to the third aspect or the possible design of the third aspect, in a possible design, the one or more configuration parameters corresponding to the first identifier include one or more of the following parameters: a twelfth parameter, where the twelfth parameter is used to indicate a list of uplink subcarrier spacings to which a logical channel of a sidelink radio bearer included in the logical channel group is mapped; a thirteenth parameter, where the thirteenth parameter is used to indicate a maximum duration of an uplink grant to which the logical channel of the sidelink radio bearer included in the logical channel group is mapped; and an eleventh parameter, where the eleventh parameter is used to indicate whether the SR is allowed to be triggered when there is a first uplink grant for the logical channel of the sidelink radio bearer included in the logical channel group, and the first uplink grant is a configured uplink grant.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; an eighth condition, where the eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group; and a tenth condition, where the tenth condition is that the terminal device has the second uplink grant, but the second uplink grant does not meet any one of the following conditions: condition g, where condition g is that the twelfth parameter corresponding to the identifier of the logical channel group to which the first logical channel belongs exists, but a subcarrier spacing associated with the second uplink grant is not included in a value set of the twelfth parameter; and condition h, where condition h is that the thirteenth parameter corresponding to the identifier of the logical channel group to which the first logical channel belongs exists, but a PUSCH duration associated with the second uplink grant is greater than a value of the thirteenth parameter.

With reference to the third aspect or the possible design of the third aspect, in a possible design, the one or more configuration parameters corresponding to the first identifier include one or more of the following parameters: a fourteenth parameter, where the fourteenth parameter is used to indicate an identifier of a logical channel of an uplink radio bearer to which a logical channel of a sidelink radio bearer included in the logical channel group is mapped; and an eleventh parameter, where the eleventh parameter is used to indicate whether the SR is allowed to be triggered when there is a first uplink grant for the logical channel of the sidelink radio bearer included in the logical channel group, and the first uplink grant is a configured uplink grant.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; an eighth condition, where the eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group; and an eleventh condition, where the eleventh condition is that the terminal device has the second uplink grant, and there is the fourteenth parameter corresponding to the identifier of the logical channel group to which the first logical channel belongs, but the second uplink grant does not meet an LCP mapping restriction configured for a logical channel of an uplink radio bearer to which the logical channel group including the first logical channel is mapped.

With reference to the third aspect or the possible design of the third aspect, in a possible design, the one or more configuration parameters corresponding to the first identifier include the following parameter: a fifteenth parameter, where the fifteenth parameter is used to indicate whether the SR is allowed to be triggered when there is a second uplink grant for a logical channel of a sidelink radio bearer included in the logical channel group, and the second uplink grant is an uplink grant used for new data transmission.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have the second uplink grant; and a twelfth condition, where the twelfth condition is that the terminal device has the second uplink grant, the fifteenth parameter corresponding to the identifier of the logical channel group to which the first logical channel belongs exists, and a value of the fifteenth parameter indicates that the SR is allowed to be triggered when the second uplink grant is available for the logical channel of the sidelink radio bearer included in the logical channel group.

With reference to the third aspect or the possible design of the third aspect, in a possible design, the one or more configuration parameters corresponding to the first identifier include the following parameter: a sixteenth parameter, where the sixteenth parameter is a second time threshold.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a thirteenth condition, where the thirteenth condition is that the terminal device has the second uplink grant, the sixteenth parameter corresponding to the identifier of the logical channel group to which the first logical channel belongs exists, and a value of the sixteenth parameter is less than a time interval between a moment at which the first logical channel triggers the first regular SL BSR and a moment at which the terminal device transmits an uplink MAC PDU including an SL BSR MAC CE next time.

With reference to the third aspect or the possible design of the third aspect, in a possible design, the first identifier is an identifier of the sidelink radio bearer; the first identifier is an identifier of a quality of service QoS flow to which the sidelink radio bearer is mapped; or the first identifier is a QoS index of QoS information associated with the sidelink radio bearer.

With reference to the third aspect or the possible design of the third aspect, in a possible design, the one or more configuration parameters corresponding to the first identifier include one or more of the following parameters: a first parameter, where the first parameter is used to indicate a list of sidelink subcarrier spacings to which an SL MAC SDU from the first logical channel can be mapped; a second parameter, where the second parameter is used to indicate a maximum duration of a PSSCH grant for transmitting the SL MAC SDU that is from the first logical channel; and a third parameter, where the third parameter is used to indicate whether the SR is allowed to be triggered when there is a first uplink grant for the first logical channel, and the first uplink grant is a configured uplink grant.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a fourteenth condition, where the fourteenth condition is that the terminal device has the first uplink grant, the third parameter corresponding to the first identifier associated with the first logical channel exists, and a value of the third parameter indicates that the SR is allowed to be triggered when the first uplink grant is available for the first logical channel; and a fifteenth condition, where the fifteenth condition is that the terminal device has the second uplink grant, but the second uplink grant does not meet any one of the following conditions: condition i, where condition i is that the first parameter corresponding to the first identifier associated with the first logical channel exists, but a subcarrier spacing associated with the second uplink grant is not included in a value set of the first parameter; and condition j, where condition j is that the second parameter corresponding to the first identifier associated with the first logical channel exists, but a PUSCH duration associated with the second uplink grant is greater than a value of the second parameter.

With reference to the third aspect or the possible design of the third aspect, in a possible design, the one or more configuration parameters corresponding to the first identifier include one or more of the following parameters: a fourth parameter, where the fourth parameter is used to indicate a list of uplink subcarrier spacings to which the first logical channel is mapped; a fifth parameter, where the fifth parameter is used to indicate a maximum duration of an uplink grant to which the first logical channel is mapped; and a third parameter, where the third parameter is used to indicate whether the SR is allowed to be triggered when there is a first uplink grant for the first logical channel, and the first uplink grant is a configured uplink grant.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a fourteenth condition, where the fourteenth condition is that the terminal device has the first uplink grant, the third parameter corresponding to the first identifier associated with the first logical channel exists, and a value of the third parameter indicates that the SR is allowed to be triggered when the first uplink grant is available for the first logical channel; and a sixteenth condition, where the sixteenth condition is that the terminal device has the second uplink grant, but the second uplink grant does not meet any one of the following conditions: condition m, where condition m is that the fourth parameter corresponding to the first identifier associated with the first logical channel exists, but a subcarrier spacing associated with the second uplink grant is not included in a value set of the fourth parameter; and condition n, where condition n is that the fifth parameter corresponding to the first identifier associated with the first logical channel exists, but a PUSCH duration associated with the second uplink grant is greater than a value of the second parameter.

With reference to the third aspect or the possible design of the third aspect, in a possible design, the one or more configuration parameters corresponding to the first identifier include one or more of the following parameters: a sixth parameter, where the sixth parameter is used to indicate an identifier of a second logical channel to which the first logical channel is mapped, and the second logical channel is a logical channel of an uplink radio bearer; and a third parameter, where the third parameter is used to indicate whether the SR is allowed to be triggered when there is a first uplink grant for the first logical channel, and the first uplink grant is a configured uplink grant.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a fourteenth condition, where the fourteenth condition is that the terminal device has the first uplink grant, the third parameter corresponding to the first identifier associated with the first logical channel exists, and a value of the third parameter indicates that the SR is allowed to be triggered when the first uplink grant is available for the first logical channel; and a seventeenth condition, where the seventeenth condition is that the terminal device has the second uplink grant, and there is the sixth parameter corresponding to the first identifier associated with the first logical channel, but the second uplink grant does not meet an LCP mapping restriction configured for the second logical channel to which the first logical channel is mapped.

With reference to the third aspect or the possible design of the third aspect, in a possible design, the one or more configuration parameters corresponding to the first identifier include the following parameter: a seventh parameter, where the seventh parameter is used to indicate whether the SR is allowed to be triggered when there is a second uplink grant for the first logical channel, and the second uplink grant is an uplink grant used for new data transmission.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have the second uplink grant; and an eighteenth condition, where the eighteenth condition is that the terminal device has the second uplink grant, the seventh parameter corresponding to the first identifier associated with the first logical channel exists, and a value of the seventh parameter indicates that the SR is allowed to be triggered when the second uplink grant is available for the first logical channel.

With reference to the third aspect or the possible design of the third aspect, in a possible design, the one or more configuration parameters corresponding to the first identifier include the following parameter: an eighth parameter, where the eighth parameter is a first time threshold.

With reference to the third aspect or the possible design of the third aspect, in a possible design, that the processor triggers an SR based on the first identifier and the one or more configuration parameters corresponding to the first identifier includes: The processor triggers the SR based on the first identifier and the one or more configuration parameters corresponding to the first identifier when any one of the following conditions is met: a first condition, where the first condition is that the terminal device does not have a second uplink grant, and the second uplink grant is an uplink grant used for new data transmission; a nineteenth condition, where the nineteenth condition is that the terminal device has the second uplink grant, the eighth parameter corresponding to the first identifier associated with the first logical channel exists, and a value of the eighth parameter is less than a time interval between a moment at which the first logical channel triggers the first regular SL BSR and a moment at which the terminal device transmits an uplink MAC PDU including an SL BSR MAC CE next time.

For a technical effect of the third aspect, refer to the technical effect of the first aspect. Details are not described herein.

According to a fourth aspect, a computer-readable storage medium is provided. The computer-readable storage medium stores instructions, and when the instructions are run on a computer, the computer is enabled to perform the method according to the first aspect.

According to a fifth aspect, a computer program product including instructions is provided. When the computer program product is run on a computer, the computer is enabled to perform the method according to the first aspect.

According to a sixth aspect, a communications apparatus (for example, the communications apparatus may be a chip or a chip system) is provided. The communications apparatus includes a processor, configured to implement the functions in the first aspect. In a possible design, the communications apparatus further includes a memory. The memory is configured to store program instructions and data that are necessary. When the communications apparatus is the chip system, the communications apparatus may include a chip, or may include a chip and another discrete component.

For technical effects brought by any design manner of the fourth aspect to the sixth aspect, refer to technical effects brought by different design manners of the first aspect. Details are not described herein again.

According to a seventh aspect, a communications system is provided. The communications system includes a network device and the terminal device according to the second aspect or the third aspect.

DESCRIPTION OF EMBODIMENTS

Figure 1A:
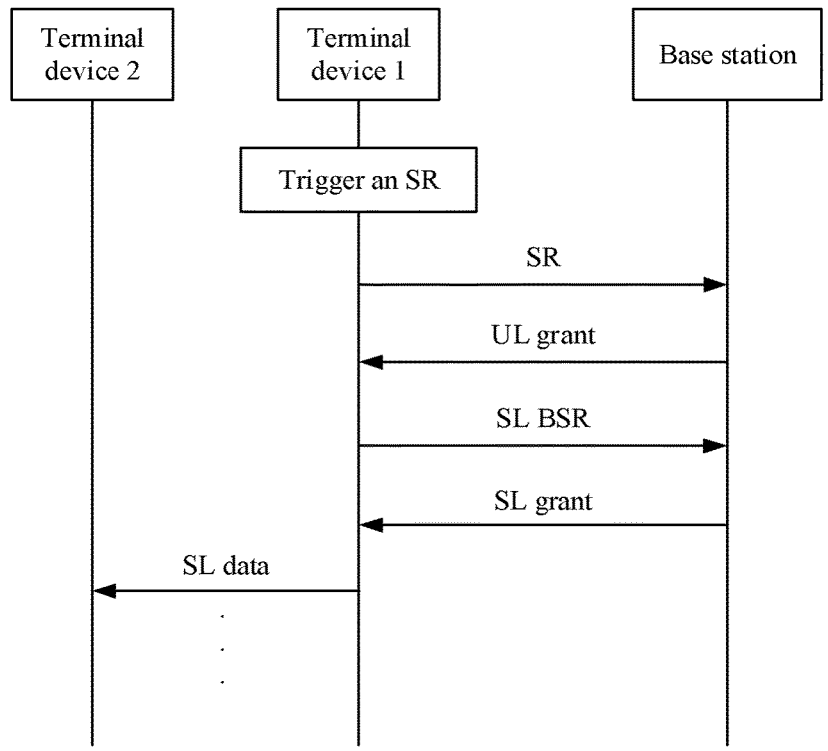
FIG. 1a is a schematic diagram of communication scheduling of a PC5 interface.

The following describes the technical solutions in the embodiments of this application with reference to accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more. "At least one item (piece) of the following" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, for convenience of clear description of the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

The technical solutions in the embodiments of this application may be used in various communications systems, such as an orthogonal frequency-division multiple access (orthogonal frequency-division multiple access, OFDMA for short) system, a single-carrier frequency division multiple access (single carrier FDMA, SC-FDMA for short) system, and other systems. The terms "system" and "network" can be interchanged with each other. The OFDMA system may implement wireless technologies such as evolved universal radio terrestrial access (evolved universal terrestrial radio access, E-UTRA for short) and ultra mobile broadband (ultra mobile broadband, UMB for short). The E-UTRA is an evolved version of a universal mobile telecommunications system (universal mobile telecommunications system, UMTS for short). The 3rd generation partnership project (3rd generation partnership project, 3GPP for short) uses a new version of E-UTRA in long term evolution (long term evolution, LTE for short) and various versions evolved based on LTE. A 5G communications system is a next-generation communications system under research, and may also be referred to as an NR system. The 5G communications system includes a 5G non-standalone (non-standalone, NSA for short) mobile communications system, a 5G standalone (standalone, SA for short) mobile communications system, or both a 5G NSA mobile communications system and a 5G SA mobile communications system. In addition, the communications systems are further applicable to a future-oriented communications technology, and are all applicable to the technical solutions provided in the embodiments of this application. The foregoing communications systems applicable to this application are merely examples for description, and communications systems applicable to this application are not limited thereto. A general description is provided herein, and details are not described below.

Figure 2:
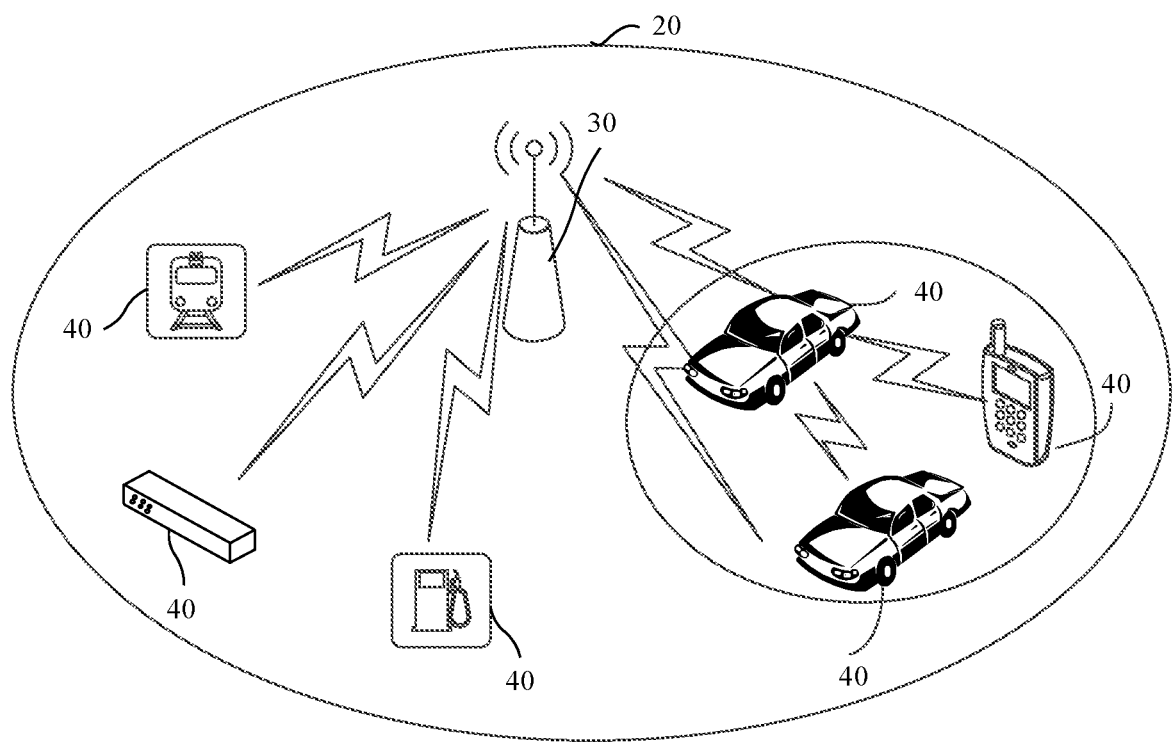
FIG. 2 is a schematic structural diagram of a communications system according to an embodiment of this application.

FIG. 2 shows a communications system 20 according to an embodiment of this application. The communications system 20 includes a network device 30 and one or more terminal devices 40 connected to the network device 30. Different terminal devices 40 may communicate with each other.

For example, the network device 30 shown in FIG. 2 interacts with any terminal device 40. In this embodiment of this application, the network device configures, for the terminal device, a condition for triggering an SR. Specifically, the network device 30 sends a first message to the terminal device 40. The first message includes a first identifier and one or more configuration parameters corresponding to the first identifier; the first identifier is an identifier of a first logical channel, or there is a mapping relationship between the first identifier and the first logical channel; and the first logical channel is a logical channel of a sidelink radio bearer. After the terminal device 40 receives the first message from the network device 30, if the first logical channel triggers a first SL BSR and the first SL BSR has not been canceled, the terminal device 40 triggers an SR based on the first identifier and the one or more configuration parameters corresponding to the first identifier. For a detailed description of the foregoing solution, refer to a subsequent method embodiment. Details are not described herein again. Based on the SR triggering mechanism, QoS requirements of different services in an NR V2X system can be met, and unnecessary SR triggering can be avoided or reduced.

Optionally, the network device 30 in this embodiment of this application is a device that connects the terminal device 40 to a wireless network, and may be an evolved NodeB (evolutional Node B, eNB or eNodeB) in long term evolution (long term evolution, LTE), a base station in a 5th generation (5th generation, 5G) network or a future evolved public land mobile network (public land mobile network, PLMN), a broadband network gateway (broadband network gateway, BNG), an aggregation switch or a non-third generation partnership project (3rd generation partnership project, 3GPP) access device, or the like. This is not specifically limited in this embodiment of this application. Optionally, the base station in this embodiment of this application may include base stations in various forms, for example, a macro base station, a micro base station (which is also referred to as a small cell), a relay station, and an access point. This is not specifically limited in this embodiment of this application.

Optionally, the terminal device 40 in this embodiment of this application may be a device such as a terminal or a chip that may be used in a terminal, configured to implement a wireless communication function. The terminal may be user equipment (user equipment, UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a virtual reality (virtual reality, VR) terminal device, an augmented reality (augmented reality, AR) terminal device, a wireless terminal in industrial control (industrial control), a wireless terminal or a vehicle in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. The terminal may be mobile or in a fixed position.

Optionally, the network device 30 and the terminal device 40 in this embodiment of this application may also be referred to as communications apparatuses, and each may be a general-purpose device or a dedicated device. This is not specifically limited in this embodiment of this application.

Figure 3:
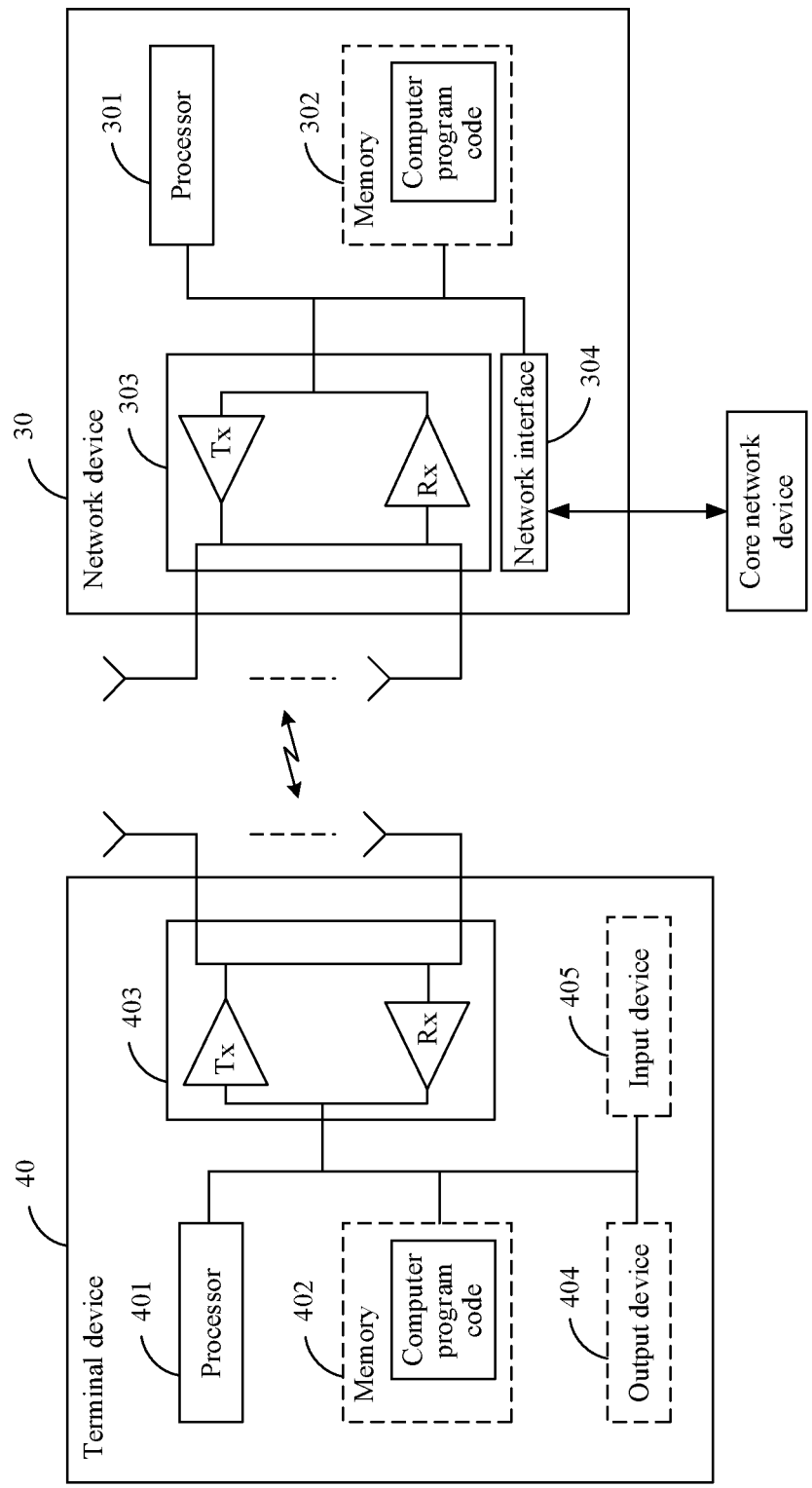
FIG. 3 is a schematic structural diagram of a terminal device and a network device according to an embodiment of this application.

Optionally, FIG. 3 is a schematic structural diagram of a network device 30 and a terminal device 40 according to an embodiment of this application.

The terminal device 40 includes at least one processor (an example in which the terminal device 40 includes one processor 401 is used for description in FIG. 3) and at least one transceiver (an example in which the terminal device 40 includes one transceiver 403 is used for description in FIG. 3). Optionally, the terminal device 40 may further include at least one memory (an example in which the terminal device 40 includes one memory 402 is used for description in FIG. 3), at least one output device (an example in which the terminal device 40 includes one output device 404 is used for description in FIG. 3), and at least one input device (an example in which the terminal device 40 includes one input device 405 is used for description in FIG. 3).

The processor 401, the memory 402, and the transceiver 403 are connected through a communications line. The communications line may include a path transmitting information between the foregoing components.

The processor 401 may be a general-purpose central processing unit (central processing unit, CPU), a microprocessor, an application-specific integrated circuit (application-specific integrated circuit, ASIC), or one or more integrated circuits configured to control program execution of the solutions in this application. In a specific implementation, in an embodiment, the processor 401 may also include a plurality of CPUs, and the processor 401 may be a single-core (single-CPU) processor or a multi-core (multi-CPU) processor. The processor herein may refer to one or more devices, circuits, or processing cores configured to process data (for example, a computer program instruction).

The memory 402 may be an apparatus having a storage function. For example, the memory 402 may be a read-only memory (read-only memory, ROM) or another type of static storage device that can store static information and an instruction, or a random access memory (random access memory, RAM) or another type of dynamic storage device that can store information and an instruction. The memory 402 may alternatively be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 402 is not limited thereto. The memory 402 may exist independently and is connected to the processor 401 through the communications line. Alternatively, the memory 402 may be integrated with the processor 401.

The memory 402 is configured to store a computer-executable instruction for performing the solutions in this application, and the processor 401 controls execution of the computer-executable instruction. Specifically, the processor 401 is configured to execute the computer-executable instruction stored in the memory 402, to implement the method for triggering an SR in the embodiments of this application. Optionally, the computer-executable instruction in this embodiment of this application may also be referred to as application program code or computer program code. This is not specifically limited in this embodiment of this application.

The transceiver 403 may use any apparatus such as a transceiver, and is configured to communicate with another device or a communications network such as an Ethernet, a radio access network (radio access network, RAN), or a wireless local area network (wireless local area networks, WLAN). The transceiver 403 includes a transmitter Tx and a receiver Rx.

The output device 404 communicates with the processor 401, and may display information in a plurality of manners. For example, the output device 404 may be a liquid crystal display (liquid crystal display, LCD), a light emitting diode (light emitting diode, LED) display device, a cathode ray tube (cathode ray tube, CRT) display device, a projector (projector), or the like.

The input device 405 communicates with the processor 401, and may receive an input of a user in a plurality of manners. For example, the input device 405 may be a mouse, a keyboard, a touchscreen device, a sensing device, or the like.

The network device 30 includes at least one processor (an example in which the network device 30 includes one processor 301 is used for description in FIG. 3), at least one transceiver (an example in which the network device 30 includes one transceiver 303 is used for description in FIG. 3), and at least one network interface (an example in which the network device 30 includes one network interface 304 is used for description in FIG. 3). Optionally, the network device 30 may further include at least one memory (an example in which the network device 30 includes one memory 302 is used for description in FIG. 3). The processor 301, the memory 302, the transceiver 303, and the network interface 304 are connected through a communications line. The network interface 304 is configured to connect to a core network device through a link (for example, an Si interface), or connect to a network interface of another network device through a wired or wireless link (for example, an X2 interface) (not shown in FIG. 3). This is not specifically limited in this embodiment of this application. In addition, for descriptions about the processor 301, the memory 302, and the transceiver 303, refer to descriptions about the processor 401, the memory 402, and the transceiver 403 in the terminal device 40. Details are not described again herein.

Figure 4:
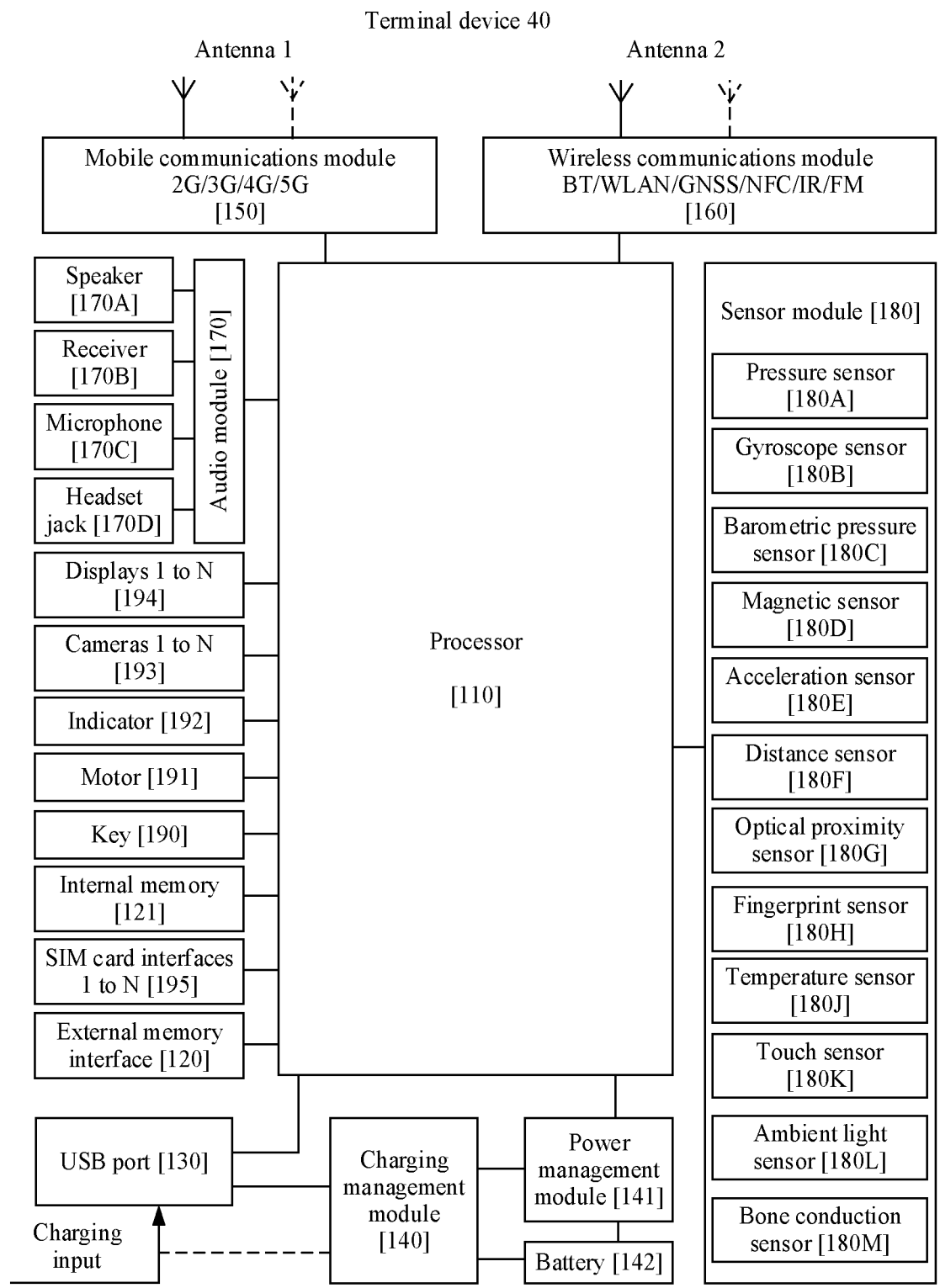
FIG. 4 is another schematic structural diagram of a terminal device according to an embodiment of this application.

With reference to the schematic structural diagram of the terminal device 40 shown in FIG. 3, for example, FIG. 4 is a specific structural form of the terminal device 40 according to an embodiment of this application.

In some embodiments, a function of the processor 401 in FIG. 3 may be implemented by a processor 110 in FIG. 4.

In some embodiments, a function of the transceiver 403 in FIG. 3 may be implemented by using an antenna 1, an antenna 2, a mobile communications module 150, a wireless communications module 160, and the like in FIG. 4.

The antenna 1 and the antenna 2 are configured to transmit and receive an electromagnetic wave signal. Each antenna in the terminal device 40 may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution used for wireless communication including 2G, 3G, 4G, 5G, and the like in the terminal device 40. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The wireless communications module 160 may provide a solution used for wireless communication including a wireless local area network (wireless local area networks, WLAN) (for example, a Wi-Fi network), Bluetooth (blue tooth, BT), a global navigational satellite system (global navigation satellite system, GNSS), frequency modulation (frequency modulation, FM), near field communication (near field communication, NFC), an infrared (infrared, IR) technology, and the like in the terminal device 40. The wireless communications module 160 may be one or more components integrated into at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2. When the terminal device 40 is a first device, that the wireless communications module 160 may provide a solution used for NFC wireless communication on the terminal device 40 means that the first device includes an NFC chip. The NFC chip can improve an NFC wireless communication function. When the terminal device 40 is a second device, that the wireless communications module 160 may provide a solution used for NFC wireless communication on the terminal device 40 means that the first device includes an electronic label (such as a radio frequency identification (radio frequency identification, RFID) label). An NFC chip, near the electronic label, of another device may perform NFC wireless communication with the second device.

In some embodiments, the antenna 1 of the terminal device 40 is coupled to the mobile communications module 150, and the antenna 2 is coupled to the wireless communications module 160, so that the terminal device 40 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (Beidou navigation satellite system, BDS), a quasi-zenith satellite system (quasi-zenith satellite system, QZSS), and/or a satellite based augmentation system (satellite based augmentation systems, SBAS).

In some embodiments, a function of the memory 402 in FIG. 3 may be implemented by using an internal memory 121, an external memory (such as a Micro SD card) connected to an external memory interface 120 in FIG. 4, or the like.

In some embodiments, a function of the output device 404 in FIG. 3 may be implemented by using a display 194 in FIG. 4. The display 194 is configured to display an image, a video, and the like. The display screen 194 includes a display panel. The display panel may be an LCD, an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, quantum dot light emitting diodes (quantum dot light emitting diodes, QLED), or the like. In some embodiments, the terminal device 40 may include one or N displays 194, where N is a positive integer greater than 1.

In some embodiments, a function of the input device 405 in FIG. 3 may be implemented by using a mouse, a keyboard, a touchscreen device, or a sensor module 180 in FIG. 4. For example, as shown in FIG. 4, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, and a bone conduction sensor 180M. This is not specifically limited in this embodiment of this application.

In some embodiments, as shown in FIG. 4, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "microphone" or a "microphone"), a headset jack 170D, or the like. This is not specifically limited in this embodiment of this application.

It may be understood that the structure shown in FIG. 4 does not constitute a specific limitation on the terminal device 40. For example, in some other embodiments of this application, the terminal device 40 may include more or fewer components than those shown in the figure, or combine some components, or split some components, or have different component arrangements. The components shown in FIG. 4 may be implemented by hardware, software, or a combination of software and hardware.

An SR triggering mechanism for an SL grant exists in LTE V2X. Specifically, if at least one BSR has been triggered and has not been canceled, and if the terminal device has a UL grant used for new data transmission within the transmission time interval (time transmission interval, TTI), and the UL grant may contain an SL BSR medium access control (medium access control, MAC) control element (control element, CE) and a MAC subheader, the terminal device transmits the SL BSR by using the UL grant. In this case, no SR is triggered. Otherwise, if a regular SL BSR has been triggered and the terminal device has no configured uplink grant (configured UL grant), the terminal device triggers the SR.

As shown in FIG. 1a, for PC5 interface communication, if the base station configures, for the terminal device 1, a resource allocation manner based on scheduling by the base station, when the terminal device 1 has sidelink data that needs to be sent but has no available sidelink grant (SL grant), the terminal device 1 needs to trigger an SR, and the UE sends the SR through a Uu interface to request an uplink grant (UL grant) from the base station. After receiving the UL grant, the terminal device 1 may send an SL buffer status report (buffer status report, BSR) to the base station based on the UL grant, so that the base station performs SL grant scheduling.

However, the NR V2X system needs to support unicast, multicast, and broadcast transmission services, and different services have different delay requirements. For example, a delay requirement of some services is 3 ms, and a delay requirement of some services is 100 ms. If an SR is triggered according to an SR triggering mechanism for an SL grant in an LTE V2X system, some services having a high delay requirement cannot request an SL grant in time. Consequently, a transmission delay requirement of data of the services cannot be met.

Figure 1B:
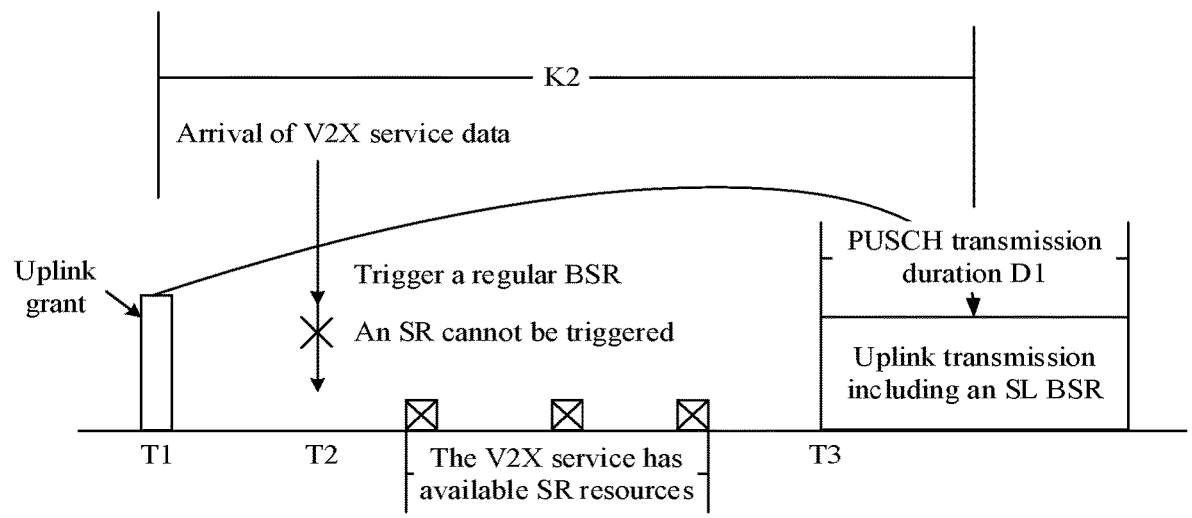
FIG. 1b is a schematic diagram 1 of a problem that may be caused by an SR triggering mechanism.
Figure 1C:
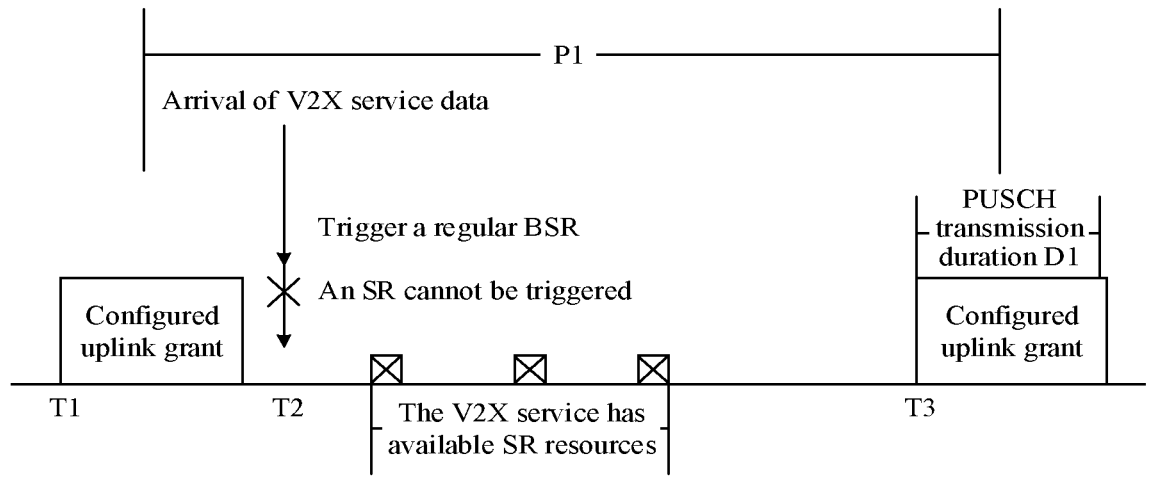
FIG. 1c is a schematic diagram 2 of a problem that may be caused by an SR triggering mechanism.

For example, as shown in FIG. 1b, at a moment T1, the terminal device receives a UL grant scheduled by the base station. A time interval K2 between the UL grant and uplink transmission is 4 ms, that is, a time interval between T1 and T3 is 4 ms. A transmission duration D1 of a physical uplink shared channel (physical uplink shared channel, PUSCH) corresponding to the UL grant is equal to 1 ms. At a moment T2, data of a V2X service arrives, and a condition for triggering a regular BSR is met, so that the regular SL BSR is triggered. However, because the terminal device has the available UL grant, a condition for triggering an SR is not met. Consequently, the SR cannot be triggered, and the terminal device can request an SL grant for the V2X service from the base station only by using an SL BSR in uplink transmission that starts at the moment T3. Alternatively, as shown in FIG. 1c, if the terminal device has a configured (configured) UL grant, and a periodicity is P1=20 ms, at a moment T2, data of a V2X service arrives, a condition for triggering a regular BSR is met, and the regular SL BSR is triggered. However, because the terminal device has the configured UL grant, a condition for triggering an SR is not met. Consequently, the SR cannot be triggered, and the terminal device can request an SL grant for the V2X service from the base station only by using an SL BSR in a configured UL grant that starts at a moment T3. However, if the data transmission for the V2X service in FIG. 1b or FIG. 1c requires a very low delay, for example, 3 ms, the foregoing process cannot meet the transmission delay requirement of the V2X service data.

Therefore, how to design an SR triggering mechanism to meet QoS requirements of different services in the NR V2X system and avoid or reduce unnecessary SR triggering is an urgent problem to be resolved.

With reference to FIG. 2 to FIG. 4, the following describes in detail the method for triggering an SR provided in the embodiments of this application by using an example in which the network device 30 shown in FIG. 2 interacts with any terminal device 40, the terminal device 40 is a terminal in an NR system, and the network device 30 is a base station in the NR system.

For example, as shown in FIG. 1a, for PC5 interface communication, if the base station configures, for the terminal device 1, a resource allocation manner based on scheduling by the base station, when the terminal device 1 has SL data that needs to be sent but has no available SL grant, the terminal device needs to trigger an SR, and the UE sends the SR through a Uu interface to request an UL grant from the base station. After receiving the UL grant, the terminal device 1 may send an SL BSR to the base station by using the UL grant, so that the base station further allocates an SL grant to the terminal device 1 based on the SL BSR, and the terminal device 1 sends SL data based on the corresponding SL grant. However, currently, no related solution is available for designing an SR triggering mechanism to meet QoS requirements of different services in the NR V2X system and avoid or reduce unnecessary SR triggering. Based on this, the embodiments of this application provide the following method for triggering an SR. The following terminal device may correspond to the terminal device 1 herein. This is described herein only, and is not described below again.

It should be noted that in the following embodiments of this application, names of messages between network elements, names of parameters in messages, or the like are merely examples, and may be other names in a specific implementation. This is not specifically limited in the embodiments of this application.

Figure 5:
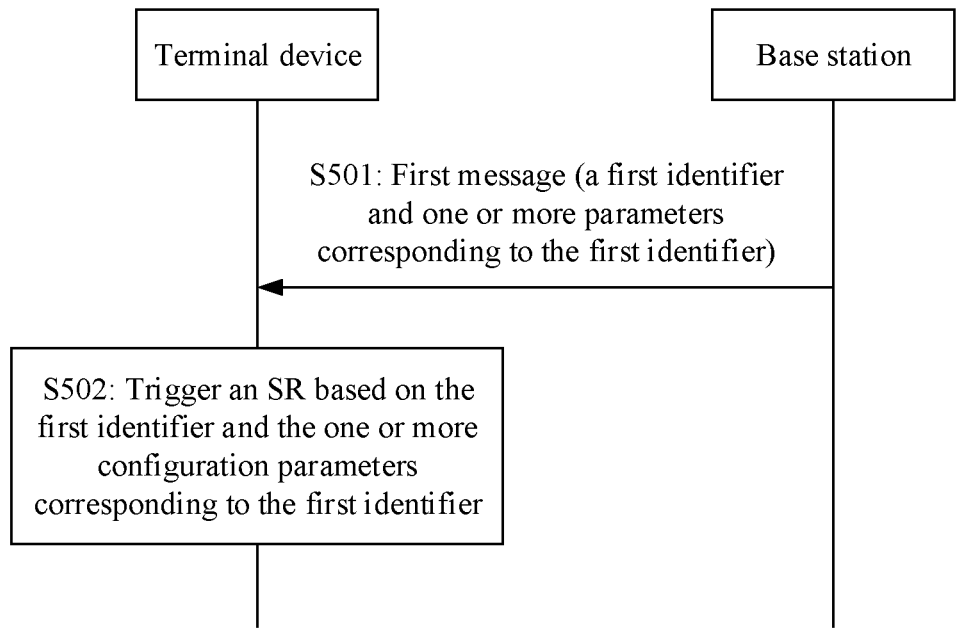
FIG. 5 is a schematic flowchart of a method for triggering an SR according to an embodiment of this application.

FIG. 5 shows a method for triggering an SR according to an embodiment of this application. The method for triggering an SR includes the following steps.

S501: A base station sends a first message to a terminal device. Correspondingly, the terminal device receives the first message from the base station.

The first message includes a first identifier and one or more configuration parameters corresponding to the first identifier. The first identifier is an identifier of a first logical channel, or there is a mapping relationship between the first identifier and the first logical channel. The first logical channel is a logical channel of a sidelink radio bearer.

For example, the first message in this embodiment of this application may be a radio resource control (radio resource control, RRC) reconfiguration (RRC reconfiguration) message.

In a possible implementation, the first message may further include destination information of a V2X service. The destination information is associated with the first identifier. The destination information is used to enable the terminal device to distinguish a destination to which the first identifier belongs, so as to trigger an SR based on the destination information, the first identifier, and the one or more configuration parameters corresponding to the first identifier.

For example, the destination information in this embodiment of this application may be a destination layer-2 identifier (destination L2 ID) or an index value mapped to a destination layer-2 identifier. This is not specifically limited in this embodiment of this application.

It should be noted that mapping in this embodiment of this application may also be described as association, correspondence, binding, or the like. To be specific, in this embodiment of this application, mapping, association, correspondence, binding, or the like may be understood as different expressions with a same meaning. This is described herein only, and is not described below.

Alternatively, in a possible implementation, the first message may further include source information and destination information of a V2X service. The source information is associated with the first identifier, and the destination information is associated with the first identifier. The source information and the destination information are used to enable the terminal device to distinguish a combination of a source and a destination to which the first identifier belongs, so as to trigger an SR based on the combination of the source information and the destination information, the first identifier, and the one or more configuration parameters corresponding to the first identifier.

For example, the source information in this embodiment of this application may be a source layer-2 identifier (source L2 ID) or an index value mapped to a source layer-2 identifier. This is not specifically limited in this embodiment of this application.

S502: If the first logical channel triggers a first SL BSR and the first SL BSR has not been canceled, the terminal device triggers the SR based on the first identifier and the one or more configuration parameters corresponding to the first identifier.

The method for triggering an SR is described in detail in the following in different cases.

Case a: The first identifier is the identifier of the first logical channel. To be specific, the base station configures, for the terminal device, a parameter that is associated with the first logical channel and that is used to control SR triggering. The first logical channel herein may be a logical channel of one or more sidelink radio bearers. The following uses any logical channel group as an example for description.

Case a may include the following five sub-cases:

Subcase 1: The one or more configuration parameters corresponding to the first identifier (that is, the identifier of the logical channel) include at least one of the following parameters.

First parameter: The first parameter is used to indicate a list of sidelink subcarrier spacings to which an SL MAC service data unit (service data unit, SDU) from the first logical channel can be mapped. Certainly, if the base station does not configure the first parameter for the first logical channel, the SL MAC SDU from the first logical channel may be mapped to any configured/available sidelink subcarrier spacing.

Second parameter: The second parameter is used to indicate a maximum duration for transmitting a physical sidelink shared channel (physical sidelink shared channel, PSSCH) grant of the SL MAC SDU that is from the first logical channel. Certainly, if the base station does not configure the second parameter for the first logical channel, a PSSCH of any duration may be used to transmit the SL MAC SDU from the first logical channel.

Third parameter: The third parameter is used to indicate whether the SR is allowed to be triggered when there is a first uplink grant for the first logical channel, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the first logical channel, and not configuring the third parameter represents that the SR is not allowed to be triggered when the first uplink grant is available for the first logical channel. This is not specifically limited herein.

Optionally, in this embodiment of this application, a type of the first uplink grant may be a current configured grant type 1 (configured grant type 1), a configured grant type 2 (configured grant type 2), or another future type. This is described herein only. The description is applicable to all the embodiments of this application, and details are not described below again.

Optionally, the uplink grant in this embodiment of this application may also be referred to as an uplink resource (UL resource). This is described herein only. The description is applicable to all the embodiments of this application, and details are not described below again.

Optionally, the base station configures at least one of the first parameter, the second parameter, or the third parameter for a sidelink logical channel only when the sidelink logical channel is configured to use a scheduling-based resource allocation manner (that is, a resource allocation mode 1).

Alternatively, optionally, the base station configures at least one of the first parameter, the second parameter, or the third parameter for a sidelink logical channel only when the sidelink logical channel is configured to use a scheduling-based resource allocation manner (that is, a resource allocation mode 1) and is mapped to unicast transmission and/or multicast transmission.

Optionally, in this embodiment of this application, configuring the sidelink logical channel to use the scheduling-based resource allocation manner includes the following two manners:

Manner 1: The base station configures, for the terminal device, whether to use the scheduling-based resource allocation manner. If the base station configures the scheduling-based resource allocation manner for the terminal device, it means that all sidelink logical channels of the terminal device use the scheduling-based resource allocation manner.

Manner 2: The base station configures, for each sidelink logical channel of the terminal device, whether to use the scheduling-based resource allocation manner.

Optionally, in this embodiment of this application, the one or more configuration parameters corresponding to the first identifier (that is, the identifier of the logical channel) further include at least one of the following parameters.

Parameter a: The parameter a is a QoS parameter index of at least one V2X service to which the first logical channel is mapped, and the QoS parameter index may be, for example, a 5G QoS identifier (5G QoS identifier, 5QI), a V2X QoS identifier (V2X QoS identifier, VQI), a QoS flow identifier (QoS flow identifier, QFI), or the like. Based on the parameter a, the terminal device may determine a logical channel to which a V2X service with a specific QoS requirement is mapped.

Parameter b: The parameter b is a priority of the first logical channel.

Parameter c: The parameter c is an identifier of a logical channel group to which the first logical channel belongs.

The foregoing parameters may be included in a configuration of the first logical channel.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Second condition: The second condition is that the terminal device has the first uplink grant, the third parameter corresponding to the identifier of the first logical channel exists, and a value of the third parameter indicates that the SR is allowed to be triggered when the first uplink grant is available for the first logical channel; or the second condition is that the terminal device has the first uplink grant, and the first regular SL BSR is not triggered because there is data transmission on a sidelink logical channel configured with the third parameter, where a value of the third parameter indicates that an SR cannot be triggered when the first uplink grant is available; or the second condition is that the terminal device has the first uplink grant and the third parameter corresponding to the identifier of the first logical channel exists.

Third condition: The third condition is that the terminal device has the second uplink grant, but the second uplink grant does not meet any one of the following conditions:

condition a, where condition a is that the first parameter corresponding to the identifier of the first logical channel exists, but a subcarrier spacing associated with the second uplink grant is not included in a value set of the first parameter; and condition b, where condition b is that the second parameter corresponding to the identifier of the first logical channel exists, but a PUSCH duration associated with the second uplink grant is greater than a value of the second parameter.

Subcase 2: The one or more configuration parameters corresponding to the first identifier (that is, the identifier of the logical channel) include at least one of the following parameters.

Fourth parameter: The fourth parameter is used to indicate a list of uplink subcarrier spacings to which the first logical channel is mapped. Certainly, if the base station does not configure the fourth parameter for the first logical channel, the uplink subcarrier spacings to which the first logical channel is mapped include any configured/available uplink subcarrier spacing.

Fifth parameter: The fifth parameter is used to indicate a maximum duration of an uplink grant to which the first logical channel is mapped. Certainly, if the base station does not configure the fifth parameter for the first logical channel, a duration of the uplink grant mapped to the first logical channel may be any value.

Third parameter: The third parameter is used to indicate whether the SR is allowed to be triggered when there is a first uplink grant for the first logical channel, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the first logical channel, and not configuring the third parameter represents that the SR is not allowed to be triggered when the first uplink grant is available for the first logical channel. This is not specifically limited herein.

Optionally, the base station configures at least one of the fourth parameter, the fifth parameter, or the third parameter for a sidelink logical channel only when the sidelink logical channel is configured to use a scheduling-based resource allocation manner (that is, a resource allocation mode 1).

Alternatively, optionally, the base station configures at least one of the fourth parameter, the fifth parameter, or the third parameter for a sidelink logical channel only when the sidelink logical channel is configured to use a scheduling-based resource allocation manner (that is, a resource allocation mode 1) and is mapped to unicast transmission and/or multicast transmission.

Optionally, in this embodiment of this application, for configuring the sidelink logical channel to use the scheduling-based resource allocation manner, refer to the foregoing subcase 1. Details are not described herein again.

Optionally, in this embodiment of this application, the one or more configuration parameters corresponding to the first identifier (that is, the identifier of the logical channel) further include one or more of a parameter a, a parameter b, or a parameter c. For related descriptions of the parameter a, the parameter b, or the parameter c, refer to the foregoing subcase 1. Details are not described herein.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Second condition: The second condition is that the terminal device has the first uplink grant, the third parameter corresponding to the identifier of the first logical channel exists, and a value of the third parameter indicates that the SR is allowed to be triggered when the first uplink grant is available for the first logical channel; or the second condition is that the terminal device has the first uplink grant, and the first regular SL BSR is not triggered because there is data transmission on a sidelink logical channel configured with the third parameter, where a value of the third parameter indicates that an SR cannot be triggered when the first uplink grant is available; or the second condition is that the terminal device has the first uplink grant and the third parameter corresponding to the identifier of the first logical channel exists.

Fourth condition: The fourth condition is that the terminal device has the second uplink grant, but the second uplink grant does not meet any one of the following conditions:

condition c, where condition c is that the fourth parameter corresponding to the identifier of the first logical channel exists, but a subcarrier spacing associated with the second uplink grant is not included in a value set of the fourth parameter; and condition d, where condition d is that the fifth parameter corresponding to the identifier of the first logical channel exists, but a PUSCH duration associated with the second uplink grant is greater than a value of the fifth parameter.

Subcase 3: The one or more configuration parameters corresponding to the first identifier (that is, the identifier of the logical channel) include at least one of the following parameters.

Sixth parameter: The sixth parameter is used to indicate an identifier of a second logical channel to which the first logical channel is mapped, and the second logical channel is a logical channel of an uplink radio bearer. A configuration of the logical channel of the uplink radio bearer includes one or more of the following parameters used in a logical channel prioritization (logical channel prioritization, LCP) process:

a list of subcarrier spacings to which an uplink MAC SDU of the logical channel of the uplink radio bearer can be mapped;

a maximum PUSCH duration of an uplink grant that can be used by the uplink MAC SDU of the logical channel of the uplink radio bearer;

whether the uplink MAC SDU of the logical channel of the uplink radio bearer can use a configuration grant of Type 1; and a serving cell list to which the uplink MAC SDU of the logical channel of the uplink radio bearer can be mapped.

Third parameter: The third parameter is used to indicate whether the SR is allowed to be triggered when there is a first uplink grant for the first logical channel, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the first logical channel, and not configuring the third parameter represents that the SR is not allowed to be triggered when the first uplink grant is available for the first logical channel. This is not specifically limited herein.

Optionally, the base station configures at least one of the sixth parameter or the third parameter for a sidelink logical channel only when the sidelink logical channel is configured to use a scheduling-based resource allocation manner (that is, a resource allocation mode 1).

Alternatively, optionally, the base station configures at least one of the sixth parameter or the third parameter for a sidelink logical channel only when the sidelink logical channel is configured to use a scheduling-based resource allocation manner (that is, a resource allocation mode 1) and is mapped to unicast transmission and/or multicast transmission.

Optionally, in this embodiment of this application, for configuring the sidelink logical channel to use the scheduling-based resource allocation manner, refer to the foregoing subcase 1. Details are not described herein again.

Optionally, in this embodiment of this application, the one or more configuration parameters corresponding to the first identifier (that is, the identifier of the logical channel) further include one or more of a parameter a, a parameter b, or a parameter c. For related descriptions of the parameter a, the parameter b, or the parameter c, refer to the foregoing subcase 1. Details are not described herein.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met:

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Second condition: The second condition is that the terminal device has the first uplink grant, the third parameter corresponding to the identifier of the first logical channel exists, and a value of the third parameter indicates that the SR is allowed to be triggered when the first uplink grant is available for the first logical channel; or the second condition is that the terminal device has the first uplink grant, and the first regular SL BSR is not triggered because there is data transmission on a sidelink logical channel configured with the third parameter, where a value of the third parameter indicates that an SR cannot be triggered when the first uplink grant is available; or the second condition is that the terminal device has the first uplink grant and the third parameter corresponding to the identifier of the first logical channel exists.

Fifth condition: The fifth condition is that the terminal device has the second uplink grant, and there is the sixth parameter corresponding to the identifier of the first logical channel, but the second uplink grant does not meet an LCP mapping restriction configured for the second logical channel to which the first logical channel is mapped. Herein, for related descriptions about that the second uplink grant does not meet an LCP mapping restriction configured for the second logical channel to which the first logical channel is mapped, refer to descriptions about that the uplink grant does not meet the LCP mapping restrictions configured for the uplink logical channel in section 5.4.3.1 in 3GPP TS 38.321, details are not described herein.

Subcase 4: The one or more configuration parameters corresponding to the first identifier (that is, the identifier of the logical channel) include the following seventh parameter.

Seventh parameter: The seventh parameter is used to indicate whether the SR is allowed to be triggered when there is a second uplink grant for the first logical channel, and the second uplink grant is an uplink grant used for new data transmission. For example, the seventh parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the seventh parameter may represent that the SR is allowed to be triggered when the second uplink grant is available for the first logical channel, and not configuring the seventh parameter represents that the SR is not allowed to be triggered when the second uplink grant is available for the first logical channel. This is not specifically limited herein.

Optionally, the base station configures the seventh parameter for a sidelink logical channel only when the sidelink logical channel is configured to use a scheduling-based resource allocation manner (that is, a resource allocation mode 1).

Alternatively, optionally, the base station configures the seventh parameter for a sidelink logical channel only when the sidelink logical channel is configured to use a scheduling-based resource allocation manner (that is, a resource allocation mode 1) and is mapped to unicast transmission and/or multicast transmission.

Optionally, in this embodiment of this application, for configuring the sidelink logical channel to use the scheduling-based resource allocation manner, refer to the foregoing subcase 1. Details are not described herein again.

Optionally, in this embodiment of this application, the one or more configuration parameters corresponding to the first identifier (that is, the identifier of the logical channel) further include one or more of a parameter a, a parameter b, or a parameter c. For related descriptions of the parameter a, the parameter b, or the parameter c, refer to the foregoing subcase 1. Details are not described herein.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Sixth condition: The sixth condition is that the terminal device has the second uplink grant, the seventh parameter corresponding to the identifier of the first logical channel exists, and a value of the seventh parameter indicates that the SR is allowed to be triggered when the second uplink grant is available for the first logical channel; or the sixth condition is that the terminal device has the second uplink grant, and the first regular SL BSR is not triggered because there is data transmission on a sidelink logical channel configured with the seventh parameter, where a value of the seventh parameter indicates that an SR cannot be triggered when the second uplink grant is available; or the sixth condition is that the terminal device has the second uplink grant and the seventh parameter corresponding to the identifier of the first logical channel exists.

Subcase 5: The one or more configuration parameters corresponding to the first identifier (that is, the identifier of the logical channel) include the following eighth parameter.

Eighth parameter: The eighth parameter is a first time threshold.

Optionally, the base station configures the eighth parameter for a sidelink logical channel only when the sidelink logical channel is configured to use a scheduling-based resource allocation manner (that is, a resource allocation mode 1).

Alternatively, optionally, the base station configures the eighth parameter for a sidelink logical channel only when the sidelink logical channel is configured to use a scheduling-based resource allocation manner (that is, a resource allocation mode 1) and is mapped to unicast transmission and/or multicast transmission.

Optionally, in this embodiment of this application, for configuring the sidelink logical channel to use the scheduling-based resource allocation manner, refer to the foregoing subcase 1. Details are not described herein again.

Optionally, in this embodiment of this application, the one or more configuration parameters corresponding to the first identifier (that is, the identifier of the logical channel) further include one or more of a parameter a, a parameter b, or a parameter c. For related descriptions of the parameter a, the parameter b, or the parameter c, refer to the foregoing subcase 1. Details are not described herein.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Seventh condition: The seventh condition is that the terminal device has the second uplink grant, the eighth parameter corresponding to the first logical channel exists, and a value of the eighth parameter is less than a time interval between a moment at which the first logical channel triggers the first regular SL BSR and a moment at which the terminal device transmits an uplink MAC protocol data unit (protocol data unit, PDU) including an SL BSR MAC CE and a corresponding MAC subheader (MAC subheader) next time.

Case b: The first identifier is an identifier of a logical channel group. To be specific, the base station configures, for the terminal device, a parameter that is associated with each logical channel group and that is used to control SR triggering. There may be one or more logical channel groups herein. The following uses any logical channel group as an example for description.

In case b, optionally, the first message may further include a mapping relationship between an identifier of the logical channel group and an identifier of a logical channel included in the logical channel group. In other words, the first message may further include an identifier of a logical channel that has a mapping relationship with the identifier of the logical channel group.

For example, the base station sets a configuration of the logical channel group for the terminal device. The configuration of the logical channel group includes at least an identifier of a logical channel included in the logical channel group. Optionally, the configuration of the logical channel group may further include an identifier of the logical channel group.

Alternatively, for example, the base station configures, for the terminal device, an identifier of a logical channel to which the identifier of the logical channel group is mapped.

Case b may include the following five sub-cases:

Subcase 6: The one or more configuration parameters corresponding to the first identifier (that is, the identifier of the logical channel group) include at least one of the following parameters.

Ninth parameter: The ninth parameter is used to indicate a list of sidelink subcarrier spacings to which an SL MAC SDU from a logical channel of a sidelink radio bearer included in the logical channel group can be mapped. Certainly, if the base station does not configure the ninth parameter for the logical channel group, the SL MAC SDU from the logical channel in the logical channel group may be mapped to any configured/available sidelink subcarrier spacing.

Tenth parameter: The tenth parameter is used to indicate a maximum duration of a PSSCH grant for transmitting an SL MAC SDU that is from a logical channel of a sidelink radio bearer included in the logical channel group. Certainly, if the base station does not configure the tenth parameter for the logical channel group, a PSSCH of any duration may be used to transmit the SL MAC SDU that is from the logical channel of the sidelink radio bearer included in the logical channel group.

Eleventh parameter: The eleventh parameter is used to indicate whether the SR is allowed to be triggered when there is a first uplink grant for the logical channel of the sidelink radio bearer included in the logical channel group, and the first uplink grant is a configured uplink grant. For example, the eleventh parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the eleventh parameter may represent that the SR is allowed to be triggered when the first uplink grant is available for the logical channel of the sidelink radio bearer included in the logical channel group, and not configuring the eleventh parameter represents that the SR is not allowed to be triggered when the first uplink grant is available for the logical channel of the sidelink radio bearer included in the logical channel group. This is not specifically limited herein.

Optionally, the base station configures one or more of the ninth parameter, the tenth parameter, or the eleventh parameter for a sidelink logical channel group only when the sidelink logical channel group is configured to use a scheduling-based resource allocation manner (that is, a resource allocation mode 1).

Optionally, the base station configures one or more of the ninth parameter, the tenth parameter, or the eleventh parameter for a sidelink logical channel group only when the sidelink logical channel group is configured to use a scheduling-based resource allocation manner (that is, a resource allocation mode 1) and is mapped to unicast transmission and/or multicast transmission.

Optionally, in this embodiment of this application, configuring the sidelink logical channel group to use the scheduling-based resource allocation manner includes the following two manners:

Manner 1: The base station configures, for the terminal device, whether to use the scheduling-based resource allocation manner. If the base station configures the scheduling-based resource allocation manner for the terminal device, it means that all sidelink logical channel groups of the terminal device use the scheduling-based resource allocation manner.

Manner 2: The base station configures, for each sidelink logical channel group of the terminal device, whether to use the scheduling-based resource allocation manner.

Optionally, in this embodiment of this application, the one or more configuration parameters corresponding to the first identifier (that is, the identifier of the logical channel group) further include one or more of the following parameters.

Parameter d: The parameter d is at least one priority to which the logical channel group is mapped. The priority may be a prose per-packet priority (prose per-packet priority, PPPP) of a V2X service packet, or a priority in a 5QI/VQI of a V2X service packet, or a priority in a 5QI/VQI corresponding to a QoS flow mapped to a V2X service. Based on the parameter d, the terminal device may determine a logical channel group to which a logical channel mapped to a V2X service packet or a V2X service QoS flow with a specific priority belongs.

Parameter e: The parameter e is at least one QoS-related index to which the logical channel group is mapped, and the QoS-related index may be, for example, a 5QI, a V2X/vehicle-to-vehicle (vehicle to vehicle, V2V) QoS identifier (V2X/V2V QoS identifier, VQI), or a QFI. The terminal device determines, based on the QoS-related index and with reference to a QoS parameter indicated by the index, a QoS flow of a V2X service associated with the index or a sidelink radio bearer to which a V2X service packet associated with the index is mapped. Based on the parameter e, the terminal device may determine a logical channel group to which a logical channel of the sidelink radio bearer belongs.

The foregoing parameters may be included in the configuration of the logical channel group.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Eighth condition: The eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group. In other words, the eighth condition is that the terminal device has the first uplink grant, and the first regular SL BSR is not triggered because there is data transmission on a logical channel in a sidelink logical channel group configured with the eleventh parameter, where a value of the eleventh parameter indicates that an SR cannot be triggered when the first uplink grant is available. Alternatively, the eighth condition is that the terminal device has the first uplink grant, and there is the eleventh parameter corresponding to the identifier of the logical channel group to which the first logical channel belongs.

Ninth condition: The ninth condition is that the terminal device has the second uplink grant, but the second uplink grant does not meet any one of the following conditions:

condition e, where condition e is that the ninth parameter corresponding to the identifier of the logical channel group to which the first logical channel belongs exists, but a subcarrier spacing associated with the second uplink grant is not included in a value set of the ninth parameter; and condition f, where condition f is that the tenth parameter corresponding to the identifier of the logical channel group to which the first logical channel belongs exists, but a PUSCH duration associated with the second uplink grant is greater than a value of the tenth parameter.

Subcase 7: The one or more configuration parameters corresponding to the first identifier (that is, the identifier of the logical channel group) include at least one of the following parameters.

Twelfth parameter: The twelfth parameter is used to indicate a list of uplink subcarrier spacings to which a logical channel of a sidelink radio bearer included in the logical channel group is mapped. Certainly, if the base station does not configure the twelfth parameter for the logical channel group, the uplink subcarrier spacings to which the logical channel of the sidelink radio bearer included in the logical channel group is mapped include any configured/available uplink subcarrier spacing.

Thirteenth parameter: The thirteenth parameter is used to indicate a maximum duration of an uplink grant to which the logical channel of the sidelink radio bearer included in the logical channel group is mapped. Certainly, if the base station does not configure the thirteenth parameter for the logical channel group, a duration of the uplink resource/grant mapped to the logical channel included in the logical channel group may be any value.

Eleventh parameter: The eleventh parameter is used to indicate whether the SR is allowed to be triggered when there is a first uplink grant for the logical channel of the sidelink radio bearer included in the logical channel group, and the first uplink grant is a configured uplink grant. For example, the eleventh parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the eleventh parameter may represent that the SR is allowed to be triggered when the first uplink grant is available for the logical channel of the sidelink radio bearer included in the logical channel group, and not configuring the eleventh parameter represents that the SR is not allowed to be triggered when the first uplink grant is available for the logical channel of the sidelink radio bearer included in the logical channel group. This is not specifically limited herein.

Optionally, the base station configures one or more of the twelfth parameter, the thirteenth parameter, or the eleventh parameter for a sidelink logical channel group only when the sidelink logical channel group is configured to use a scheduling-based resource allocation manner (that is, a resource allocation mode 1).

Optionally, the base station configures one or more of the twelfth parameter, the thirteenth parameter, or the eleventh parameter for a sidelink logical channel group only when the sidelink logical channel group is configured to use a scheduling-based resource allocation manner (that is, a resource allocation mode 1) and is mapped to unicast transmission and/or multicast transmission.

Optionally, in this embodiment of this application, for configuring the sidelink logical channel group to use the scheduling-based resource allocation manner, refer to the foregoing subcase 6. Details are not described herein again.

Optionally, in this embodiment of this application, the one or more configuration parameters corresponding to the first identifier (that is, the identifier of the logical channel group) further include one or more of a parameter d or a parameter e. For related descriptions of the parameter d or the parameter e, refer to the foregoing subcase 6. Details are not described herein.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Eighth condition: The eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group. In other words, the eighth condition is that the terminal device has the first uplink grant, and the first regular SL BSR is not triggered because there is data transmission on a logical channel in a sidelink logical channel group configured with the eleventh parameter, where a value of the eleventh parameter indicates that an SR cannot be triggered when the first uplink grant is available. Alternatively, the eighth condition is that the terminal device has the first uplink grant, and there is the eleventh parameter corresponding to the identifier of the logical channel group to which the first logical channel belongs.

Tenth condition: The tenth condition is that the terminal device has the second uplink grant, but the second uplink grant does not meet any one of the following conditions:

condition g, where condition g is that the twelfth parameter corresponding to the identifier of the logical channel group to which the first logical channel belongs exists, but a subcarrier spacing associated with the second uplink grant is not included in a value set of the twelfth parameter; and condition h, where condition h is that the thirteenth parameter corresponding to the identifier of the logical channel group to which the first logical channel belongs exists, but a PUSCH duration associated with the second uplink grant is greater than a value of the thirteenth parameter.

Subcase 8: The one or more configuration parameters corresponding to the first identifier (that is, the identifier of the logical channel group) include at least one of the following parameters.

Fourteenth parameter: The fourteenth parameter is used to indicate an identifier of a logical channel of an uplink radio bearer to which a logical channel of a sidelink radio bearer included in the logical channel group is mapped. A configuration of the logical channel of the uplink radio bearer includes one or more of the following parameters used in an LCP process:

a list of subcarrier spacings to which an uplink MAC SDU of the logical channel of the uplink radio bearer can be mapped;

a maximum PUSCH duration of an uplink grant that can be used by the uplink MAC SDU of the logical channel of the uplink radio bearer;

whether the uplink MAC SDU of the logical channel of the uplink radio bearer can use a configuration grant of Type 1; and a serving cell list to which the uplink MAC SDU of the logical channel of the uplink radio bearer can be mapped.

Eleventh parameter: The eleventh parameter is used to indicate whether the SR is allowed to be triggered when there is a first uplink grant for the logical channel of the sidelink radio bearer included in the logical channel group, and the first uplink grant is a configured uplink grant. For example, the eleventh parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the eleventh parameter may represent that the SR is allowed to be triggered when the first uplink grant is available for the logical channel of the sidelink radio bearer included in the logical channel group, and not configuring the eleventh parameter represents that the SR is not allowed to be triggered when the first uplink grant is available for the logical channel of the sidelink radio bearer included in the logical channel group. This is not specifically limited herein.

Optionally, the base station configures one or more of the fourteenth parameter or the eleventh parameter for a sidelink logical channel group only when the sidelink logical channel group is configured to use a scheduling-based resource allocation manner (that is, a resource allocation mode 1).

Optionally, the base station configures one or more of the fourteenth parameter or the eleventh parameter for a sidelink logical channel group only when the sidelink logical channel group is configured to use a scheduling-based resource allocation manner (that is, a resource allocation mode 1) and is mapped to unicast transmission and/or multicast transmission.

Optionally, in this embodiment of this application, for configuring the sidelink logical channel group to use the scheduling-based resource allocation manner, refer to the foregoing subcase 6. Details are not described herein again.

Optionally, in this embodiment of this application, the one or more configuration parameters corresponding to the first identifier (that is, the identifier of the logical channel group) further include one or more of a parameter d or a parameter e. For related descriptions of the parameter d or the parameter e, refer to the foregoing subcase 6. Details are not described herein.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Eighth condition: The eighth condition is that the terminal device has the first uplink grant, the eleventh parameter corresponding to the identifier of the logical channel group to which the first logical channel belongs exists, and a value of the eleventh parameter indicates that the SR is allowed to be triggered when the first uplink grant is available for the logical channel of the sidelink radio bearer included in the logical channel group. In other words, the eighth condition is that the terminal device has the first uplink grant, and the first regular SL BSR is not triggered because there is data transmission on a logical channel in a sidelink logical channel group configured with the eleventh parameter, where a value of the eleventh parameter indicates that an SR cannot be triggered when the first uplink grant is available. Alternatively, the eighth condition is that the terminal device has the first uplink grant, and there is the eleventh parameter corresponding to the identifier of the logical channel group to which the first logical channel belongs.

Eleventh condition: The eleventh condition is that the terminal device has the second uplink grant, and there is the fourteenth parameter corresponding to the identifier of the logical channel group to which the first logical channel belongs, but the second uplink grant does not meet an LCP mapping restriction configured for a logical channel of an uplink radio bearer to which the logical channel group including the first logical channel is mapped. Herein, for related descriptions about that the second uplink grant does not meet an LCP mapping restriction configured for a logical channel of an uplink radio bearer to which the logical channel group including the first logical channel is mapped, refer to descriptions about that the uplink grant does not meet the LCP mapping restrictions configured for the uplink logical channel in section 5.4.3.1 in 3GPP TS 38.321, details are not described herein.

Subcase 9: The one or more configuration parameters corresponding to the first identifier (that is, the identifier of the logical channel group) include the following fifteenth parameter.

Fifteenth parameter: The fifteenth parameter is used to indicate whether the SR is allowed to be triggered when there is a second uplink grant for a logical channel of a sidelink radio bearer included in the logical channel group, and the second uplink grant is an uplink grant used for new data transmission. For example, the fifteenth parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the fifteenth parameter may represent that the SR is allowed to be triggered when the second uplink grant is available for the logical channel of the sidelink radio bearer included in the logical channel group, and not configuring the fifteenth parameter represents that the SR is not allowed to be triggered when the second uplink grant is available for the logical channel of the sidelink radio bearer included in the logical channel group. This is not specifically limited herein.

Optionally, the base station configures the fifteenth parameter for a sidelink logical channel group only when the sidelink logical channel group is configured to use a scheduling-based resource allocation manner (that is, a resource allocation mode 1).

Alternatively, optionally, the base station configures the fifteenth parameter for a sidelink logical channel group only when the sidelink logical channel group is configured to use a scheduling-based resource allocation manner (that is, a resource allocation mode 1) and is mapped to unicast transmission and/or multicast transmission.

Optionally, in this embodiment of this application, for configuring the sidelink logical channel group to use the scheduling-based resource allocation manner, refer to the foregoing subcase 6. Details are not described herein again.

Optionally, in this embodiment of this application, the one or more configuration parameters corresponding to the first identifier (that is, the identifier of the logical channel group) further include one or more of a parameter d or a parameter e. For related descriptions of the parameter d or the parameter e, refer to the foregoing subcase 6. Details are not described herein.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Twelfth condition: The twelfth condition is that the terminal device has the second uplink grant, the fifteenth parameter corresponding to the identifier of the logical channel group to which the first logical channel belongs exists, and a value of the fifteenth parameter indicates that the SR is allowed to be triggered when the second uplink grant is available for the logical channel of the sidelink radio bearer included in the logical channel group. In other words, the twelfth condition is that the terminal device has the second uplink grant, and the first regular SL BSR is not triggered because there is data transmission on a logical channel in a sidelink logical channel group configured with the fifteenth parameter, where a value of the fifteenth parameter indicates that an SR cannot be triggered when the second uplink grant is available. Alternatively, the twelfth condition is that the terminal device has the second uplink grant, and there is the fifteenth parameter corresponding to the identifier of the logical channel group to which the first logical channel belongs.

Subcase 10: The one or more configuration parameters corresponding to the first identifier (that is, the identifier of the logical channel group) include the following sixteenth parameter.

Sixteenth parameter: The eighth parameter is a second time threshold.

Optionally, the base station configures the sixteenth parameter for a sidelink logical channel group only when the sidelink logical channel group is configured to use a scheduling-based resource allocation manner (that is, a resource allocation mode 1).

Alternatively, optionally, the base station configures the sixteenth parameter for a sidelink logical channel group only when the sidelink logical channel group is configured to use a scheduling-based resource allocation manner (that is, a resource allocation mode 1) and is mapped to unicast transmission and/or multicast transmission.

Optionally, in this embodiment of this application, for configuring the sidelink logical channel group to use the scheduling-based resource allocation manner, refer to the foregoing subcase 6. Details are not described herein again.

Optionally, in this embodiment of this application, the one or more configuration parameters corresponding to the first identifier (that is, the identifier of the logical channel group) further include one or more of a parameter d or a parameter e. For related descriptions of the parameter d or the parameter e, refer to the foregoing subcase 6. Details are not described herein.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Thirteenth condition: The thirteenth condition is that the terminal device has the second uplink grant, the sixteenth parameter corresponding to the identifier of the logical channel group to which the first logical channel belongs exists, and a value of the sixteenth parameter is less than a time interval between a moment at which the first logical channel triggers the first regular SL BSR and a moment at which the terminal device transmits an uplink MAC PDU including an SL BSR MAC CE and a corresponding MAC subheader next time.

Case c: The first identifier is an identifier of a sidelink radio bearer. To be specific, the base station configures, for the terminal device, a parameter that is associated with the sidelink radio bearer and that is used to control SR triggering. There may be one or more sidelink radio bearers herein. The following uses any sidelink radio bearer as an example for description.

In case c, optionally, the first message may further include a mapping relationship between an identifier of the sidelink radio bearer and an identifier of a logical channel of the sidelink radio bearer. In other words, the first message may further include an identifier of a logical channel of the sidelink radio bearer that has a mapping relationship with an identifier of the sidelink radio bearer.

For example, the base station configures, for the terminal device, the identifier that is of the logical channel of the sidelink radio bearer and to which the identifier of the sidelink radio bearer is mapped.

Case c may include the following five sub-cases:

Subcase 11: The one or more configuration parameters corresponding to the first identifier (that is, the identifier of the sidelink radio bearer) include at least one of the following parameters.

First parameter: The first parameter is used to indicate a list of sidelink subcarrier spacings to which an SL MAC SDU from a logical channel of the sidelink radio bearer can be mapped. Certainly, if the base station does not configure the first parameter for the sidelink radio bearer, the SL MAC SDU from the logical channel of the sidelink radio bearer may be mapped to any configured/available sidelink subcarrier spacing.

Second parameter: The second parameter is used to indicate a maximum duration of a PSSCH grant for transmitting the SL MAC SDU that is from the logical channel of the sidelink radio bearer. Certainly, if the base station does not configure the second parameter for the sidelink radio bearer, a PSSCH of any duration may be used to transmit the SL MAC SDU that is from the logical channel of the sidelink radio bearer.

Third parameter: The third parameter is used to indicate whether the SR is allowed to be triggered when there is a first uplink grant for the logical channel of the sidelink radio bearer, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the logical channel of the sidelink radio bearer, and not configuring the third parameter represents that the SR is not allowed to be triggered when the first uplink grant is available for the logical channel of the sidelink radio bearer. This is not specifically limited herein.

Optionally, the base station configures at least one of the first parameter, the second parameter, or the third parameter for a sidelink radio bearer only when the sidelink radio bearer is configured to use a scheduling-based resource allocation manner (that is, a resource allocation mode 1).

Alternatively, optionally, the base station configures at least one of the first parameter, the second parameter, or the third parameter for a sidelink radio bearer only when the sidelink radio bearer is configured to use a scheduling-based resource allocation manner (that is, a resource allocation mode 1) and is mapped to unicast transmission and/or multicast transmission.

Optionally, in this embodiment of this application, configuring the sidelink radio bearer to use the scheduling-based resource allocation manner includes the following two manners:

Manner 1: The base station configures, for the terminal device, whether to use the scheduling-based resource allocation manner. If the base station configures the scheduling-based resource allocation manner for the terminal device, it means that all sidelink radio bearers of the terminal device use the scheduling-based resource allocation manner.

Manner 2: The base station configures, for each sidelink radio bearer of the terminal device, whether to use the scheduling-based resource allocation manner.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Fourteenth condition: The fourteenth condition is that the terminal device has the first uplink grant, the third parameter corresponding to the identifier of the sidelink radio bearer associated with the first logical channel exists, and a value of the third parameter indicates that the SR is allowed to be triggered when the first uplink grant is available for the logical channel of the sidelink radio bearer; or the fourteenth condition is that the terminal device has the first uplink grant, and the first regular SL BSR is not triggered because there is data transmission on a logical channel of a sidelink radio bearer configured with the third parameter, where a value of the third parameter indicates that an SR cannot be triggered when the first uplink grant is available; or the fourteenth condition is that the terminal device has the first uplink grant and the third parameter corresponding to the identifier of the sidelink radio bearer associated with the first logical channel exists.

Fifteenth condition: The fifteenth condition is that the terminal device has the second uplink grant, but the second uplink grant does not meet any one of the following conditions: condition i, where condition i is that the first parameter corresponding to the identifier of the sidelink radio bearer associated with the first logical channel exists, but a subcarrier spacing associated with the second uplink grant is not included in a value set of the first parameter; and condition j, where condition j is that the second parameter corresponding to the identifier of the sidelink radio bearer associated with the first logical channel exists, but a PUSCH duration associated with the second uplink grant is greater than a value of the second parameter.

Subcase 12: The one or more configuration parameters corresponding to the first identifier (that is, the identifier of the sidelink radio bearer) include at least one of the following parameters.

Fourth parameter: The fourth parameter is used to indicate a list of uplink subcarrier spacings to which a logical channel of the sidelink radio bearer is mapped. Certainly, if the base station does not configure the fourth parameter for the sidelink radio bearer, the logical channel of the sidelink radio bearer may be mapped to any configured/available uplink subcarrier spacing.

Fifth parameter: The fifth parameter is used to indicate a maximum duration of an uplink grant to which the logical channel of the sidelink radio bearer is mapped. Certainly, if the base station does not configure the fifth parameter for the sidelink radio bearer, a duration of the uplink grant mapped to the logical channel of the sidelink radio bearer may be any value.

Third parameter: The third parameter is used to indicate whether the SR is allowed to be triggered when there is a first uplink grant for the logical channel of the sidelink radio bearer, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the logical channel of the sidelink radio bearer, and not configuring the third parameter represents that the SR is not allowed to be triggered when the first uplink grant is available for the logical channel of the sidelink radio bearer. This is not specifically limited herein.

Optionally, the base station configures at least one of the fourth parameter, the fifth parameter, or the third parameter for a sidelink radio bearer only when the sidelink radio bearer is configured to use a scheduling-based resource allocation manner (that is, a resource allocation mode 1).

Alternatively, optionally, the base station configures at least one of the fourth parameter, the fifth parameter, or the third parameter for a sidelink radio bearer only when the sidelink radio bearer is configured to use a scheduling-based resource allocation manner (that is, a resource allocation mode 1) and is mapped to unicast transmission and/or multicast transmission.

Optionally, in this embodiment of this application, for configuring the sidelink radio bearer to use the scheduling-based resource allocation manner, refer to the foregoing subcase 11. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant (that is, the identifier of the sidelink radio bearer) used for new data transmission.

Fourteenth condition: The fourteenth condition is that the terminal device has the first uplink grant, the third parameter corresponding to the identifier of the sidelink radio bearer associated with the first logical channel exists, and a value of the third parameter indicates that the SR is allowed to be triggered when the first uplink grant is available for the logical channel of the sidelink radio bearer; or the fourteenth condition is that the terminal device has the first uplink grant, and the first regular SL BSR is not triggered because there is data transmission on a logical channel of a sidelink radio bearer configured with the third parameter, where a value of the third parameter indicates that an SR cannot be triggered when the first uplink grant is available; or the fourteenth condition is that the terminal device has the first uplink grant and the third parameter corresponding to the identifier of the sidelink radio bearer associated with the first logical channel exists.

Sixteenth condition: The sixteenth condition is that the terminal device has the second uplink grant, but the second uplink grant does not meet any one of the following conditions:

condition m, where condition m is that the fourth parameter corresponding to the identifier of the sidelink radio bearer associated with the first logical channel exists, but a subcarrier spacing associated with the second uplink grant is not included in a value set of the fourth parameter; and condition n, where condition n is that the fifth parameter corresponding to the identifier of the sidelink radio bearer associated with the first logical channel exists, but a PUSCH duration associated with the second uplink grant is greater than a value of the fifth parameter.

Subcase 13: The one or more configuration parameters corresponding to the first identifier (that is, the identifier of the sidelink radio bearer) include at least one of the following parameters.

Sixth parameter: The sixth parameter is used to indicate an identifier of a second logical channel to which a logical channel of the sidelink radio bearer is mapped, and the second logical channel is a logical channel of an uplink radio bearer. A configuration of the logical channel of the uplink radio bearer includes one or more of the following parameters used in an LCP process:

a list of subcarrier spacings to which an uplink MAC SDU of the logical channel of the uplink radio bearer can be mapped;

a maximum PUSCH duration of an uplink grant that can be used by the uplink MAC SDU of the logical channel of the uplink radio bearer;

whether the uplink MAC SDU of the logical channel of the uplink radio bearer can use a configuration grant of Type 1; and a serving cell list to which the uplink MAC SDU of the logical channel of the uplink radio bearer can be mapped.

Third parameter: The third parameter is used to indicate whether the SR is allowed to be triggered when there is a first uplink grant for the logical channel of the sidelink radio bearer, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the logical channel of the sidelink radio bearer, and not configuring the third parameter represents that the SR is not allowed to be triggered when the first uplink grant is available for the logical channel of the sidelink radio bearer. This is not specifically limited herein.

Optionally, the base station configures at least one of the sixth parameter or the third parameter for a sidelink radio bearer only when the sidelink radio bearer is configured to use a scheduling-based resource allocation manner (that is, a resource allocation mode 1).

Alternatively, optionally, the base station configures at least one of the sixth parameter or the third parameter for a sidelink radio bearer only when the sidelink radio bearer is configured to use a scheduling-based resource allocation manner (that is, a resource allocation mode 1) and is mapped to unicast transmission and/or multicast transmission.

Optionally, in this embodiment of this application, for configuring the sidelink radio bearer to use the scheduling-based resource allocation manner, refer to the foregoing subcase 11. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Fourteenth condition: The fourteenth condition is that the terminal device has the first uplink grant, the third parameter corresponding to the identifier of the sidelink radio bearer associated with the first logical channel exists, and a value of the third parameter indicates that the SR is allowed to be triggered when the first uplink grant is available for the logical channel of the sidelink radio bearer; or the fourteenth condition is that the terminal device has the first uplink grant, and the first regular SL BSR is not triggered because there is data transmission on a logical channel of a sidelink radio bearer configured with the third parameter, where a value of the third parameter indicates that an SR cannot be triggered when the first uplink grant is available; or the fourteenth condition is that the terminal device has the first uplink grant and the third parameter corresponding to the identifier of the sidelink radio bearer associated with the first logical channel exists.

Seventeenth condition: The seventeenth condition is that the terminal device has the second uplink grant, and there is the sixth parameter corresponding to the identifier of the sidelink radio bearer associated with the first logical channel, but the second uplink grant does not meet an LCP mapping restriction configured for the second logical channel to which the first logical channel is mapped. Herein, for related descriptions about that the second uplink grant does not meet an LCP mapping restriction configured for the second logical channel to which the first logical channel is mapped, refer to descriptions about that the uplink grant does not meet the LCP mapping restrictions configured for the uplink logical channel in section 5.4.3.1 in 3GPP TS 38.321, details are not described herein.

Subcase 14: The one or more configuration parameters corresponding to the first identifier include the following seventh parameter.

Seventh parameter: The seventh parameter is used to indicate whether the SR is allowed to be triggered when there is a second uplink grant for the logical channel of the sidelink radio bearer, and the second uplink grant is an uplink grant used for new data transmission. For example, the seventh parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the seventh parameter may represent that the SR is allowed to be triggered when the second uplink grant is available for the logical channel of the sidelink radio bearer, and not configuring the seventh parameter represents that the SR is not allowed to be triggered when the second uplink grant is available for the logical channel of the sidelink radio bearer. This is not specifically limited herein.

Optionally, the base station configures the seventh parameter for a sidelink radio bearer only when the sidelink radio bearer is configured to use a scheduling-based resource allocation manner (that is, a resource allocation mode 1).

Alternatively, optionally, the base station configures the seventh parameter for a sidelink radio bearer only when the sidelink radio bearer is configured to use a scheduling-based resource allocation manner (that is, a resource allocation mode 1) and is mapped to unicast transmission and/or multicast transmission.

Optionally, in this embodiment of this application, for configuring the sidelink radio bearer to use the scheduling-based resource allocation manner, refer to the foregoing subcase 11. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Eighteenth condition: The eighteenth condition is that the terminal device has the second uplink grant, the seventh parameter corresponding to the identifier of the sidelink radio bearer associated with the first logical channel exists, and a value of the seventh parameter indicates that the SR is allowed to be triggered when the second uplink grant is available for the logical channel of the sidelink radio bearer; or the eighteenth condition is that the terminal device has the first uplink grant, and the first regular SL BSR is not triggered because there is data transmission on a logical channel of a sidelink radio bearer configured with the seventh parameter, where a value of the seventh parameter indicates that an SR cannot be triggered when the second uplink grant is available; or the eighteenth condition is that the terminal device has the second uplink grant and the seventh parameter corresponding to the identifier of the sidelink radio bearer associated with the first logical channel exists.

Subcase 15: The one or more configuration parameters corresponding to the first identifier (that is, the identifier of the sidelink radio bearer) include the following eighth parameter.

Eighth parameter: The eighth parameter is a first time threshold.

Optionally, the base station configures the eighth parameter for a sidelink radio bearer only when the sidelink radio bearer is configured to use a scheduling-based resource allocation manner (that is, a resource allocation mode 1).

Alternatively, optionally, the base station configures the eighth parameter for a sidelink radio bearer only when the sidelink radio bearer is configured to use a scheduling-based resource allocation manner (that is, a resource allocation mode 1) and is mapped to unicast transmission and/or multicast transmission.

Optionally, in this embodiment of this application, for configuring the sidelink radio bearer to use the scheduling-based resource allocation manner, refer to the foregoing subcase 11. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Nineteenth condition: The nineteenth condition is that the terminal device has the second uplink grant, the eighth parameter corresponding to the identifier of the sidelink radio bearer associated with the first logical channel exists, and a value of the eighth parameter is less than a time interval between a moment at which the first logical channel triggers the first regular SL BSR and a moment at which the terminal device transmits an uplink MAC PDU including an SL BSR MAC CE and a corresponding MAC subheader next time.

Case d: The first identifier is an identifier of a QoS flow. To be specific, the base station configures, for the terminal device, a parameter that is associated with the QoS flow and that is used to control SR triggering. There may be one or more QoS flows herein. The following uses any QoS flow as an example for description. The terminal device may determine, based on the identifier of the QoS flow and a QoS parameter indicated/corresponding to the identifier of the QoS flow, a sidelink radio bearer to which the QoS flow is mapped. The identifier of the QoS flow correspondingly indicates several QoS parameters, including but not limited to a guaranteed transmission rate, a maximum transmission rate, a delay requirement, a reliability requirement, a priority, and a communication distance.

In case d, optionally, the first message may further include a mapping relationship between the identifier of the QoS flow and an identifier of a sidelink radio bearer. In other words, the first message may further include an identifier of a sidelink radio bearer that has a mapping relationship with the identifier of the QoS flow.

For example, the base station sets a configuration of a sidelink radio bearer for the terminal device. The configuration of the sidelink radio bearer includes at least an identifier of a QoS flow mapped to the sidelink radio bearer and an identifier of a logical channel of the sidelink radio bearer. Optionally, the configuration of the sidelink radio bearer may further include an identifier of the sidelink radio bearer.

Alternatively, for example, the base station configures, for the terminal device, an identifier of a sidelink radio bearer mapped to an identifier of a QoS flow, and sets a configuration of the sidelink radio bearer for the terminal device. The configuration of the sidelink radio bearer includes at least an identifier of a logical channel of the sidelink radio bearer. Optionally, the configuration of the sidelink radio bearer may further include an identifier of the sidelink radio bearer.

Case d may include the following five sub-cases:

Subcase 16: The one or more configuration parameters corresponding to the first identifier (that is, the identifier of the QoS flow) include at least one of the following parameters.

First parameter: The first parameter is used to indicate a list of sidelink subcarrier spacings to which an SL MAC SDU from the logical channel of the sidelink radio bearer mapped to the identifier of the QoS flow can be mapped. Certainly, if the base station does not configure the first parameter for the sidelink radio bearer, the SL MAC SDU from the logical channel of the sidelink radio bearer mapped to the identifier of the QoS flow may be mapped to any configured/available sidelink subcarrier spacing.

Second parameter: The second parameter is used to indicate a maximum duration of a PSSCH grant for transmitting the SL MAC SDU that is from the logical channel of the sidelink radio bearer mapped to the identifier of the QoS flow. Certainly, if the base station does not configure the second parameter for the sidelink radio bearer mapped to the identifier of the QoS flow, a PSSCH of any duration may be used to transmit the SL MAC SDU that is from the logical channel of the sidelink radio bearer mapped to the identifier of the QoS flow.

Third parameter: The third parameter is used to indicate whether the SR is allowed to be triggered when there is a first uplink grant for the logical channel of the sidelink radio bearer mapped to the identifier of the QoS flow, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the logical channel of the sidelink radio bearer mapped to the identifier of the QoS flow, and not configuring the third parameter represents that the SR is not allowed to be triggered when the first uplink grant is available for the logical channel of the sidelink radio bearer mapped to the identifier of the QoS flow. This is not specifically limited herein.

Optionally, the base station configures at least one of the first parameter, the second parameter, or the third parameter for a QoS flow only when the QoS flow is configured to use a scheduling-based resource allocation manner (that is, a resource allocation mode 1).

Optionally, the base station configures at least one of the first parameter, the second parameter, or the third parameter for a QoS flow only when the QoS flow is configured to use a scheduling-based resource allocation manner (that is, a resource allocation mode 1) and is mapped to unicast transmission and/or multicast transmission.

Optionally, in this embodiment of this application, configuring the QoS flow to use the scheduling-based resource allocation manner includes the following two manners:

Manner 1: The base station configures, for the terminal device, whether to use the scheduling-based resource allocation manner. If the base station configures the scheduling-based resource allocation manner for the terminal device, it means that all QoS flows of the terminal device use the scheduling-based resource allocation manner.

Manner 2: The base station configures, for each QoS flow of the terminal device, whether to use the scheduling-based resource allocation manner.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Fourteenth condition: The fourteenth condition is that the terminal device has the first uplink grant, the third parameter corresponding to the identifier of the QoS flow associated with the first logical channel exists, and a value of the third parameter indicates that the SR is allowed to be triggered when the first uplink grant is available for the logical channel of the sidelink radio bearer mapped to the identifier of the QoS flow; or the fourteenth condition is that the terminal device has the first uplink grant, and the first regular SL BSR is not triggered because there is data transmission on a logical channel of a sidelink radio bearer configured with the third parameter, where a value of the third parameter indicates that an SR cannot be triggered when the first uplink grant is available; or the fourteenth condition is that the terminal device has the first uplink grant and the third parameter corresponding to the identifier of the QoS flow associated with the first logical channel exists.

Fifteenth condition: The fifteenth condition is that the terminal device has the second uplink grant, but the second uplink grant does not meet any one of the following conditions: condition i, where condition i is that the first parameter corresponding to the identifier of the QoS flow associated with the first logical channel exists, but a subcarrier spacing associated with the second uplink grant is not included in a value set of the first parameter; and condition j, where condition j is that the second parameter corresponding to the identifier of the QoS flow associated with the first logical channel exists, but a PUSCH duration associated with the second uplink grant is greater than a value of the second parameter.

Subcase 17: The one or more configuration parameters corresponding to the first identifier (that is, the identifier of the QoS flow) include at least one of the following parameters.

Fourth parameter: The fourth parameter is used to indicate a list of uplink subcarrier spacings to which a logical channel of the sidelink radio bearer mapped to the identifier of the QoS flow is mapped. Certainly, if the base station does not configure the fourth parameter for the sidelink radio bearer, the logical channel of the sidelink radio bearer mapped to the identifier of the QoS flow may be mapped to any configured/available uplink subcarrier spacing.

Fifth parameter: The fifth parameter is used to indicate a maximum duration of an uplink grant to which the logical channel of the sidelink radio bearer mapped to the identifier of the QoS flow is mapped. Certainly, if the base station does not configure the fifth parameter for the sidelink radio bearer mapped to the identifier of the QoS flow, a duration of the uplink grant mapped to the logical channel of the sidelink radio bearer mapped to the identifier of the QoS flow may be any value.

Third parameter: The third parameter is used to indicate whether the SR is allowed to be triggered when there is a first uplink grant for the logical channel of the sidelink radio bearer mapped to the identifier of the QoS flow, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the logical channel of the sidelink radio bearer mapped to the identifier of the QoS flow, and not configuring the third parameter represents that the SR is not allowed to be triggered when the first uplink grant is available for the logical channel of the sidelink radio bearer mapped to the identifier of the QoS flow. This is not specifically limited herein.

Optionally, the base station configures at least one of the fourth parameter, the fifth parameter, or the third parameter for a QoS flow only when the QoS flow is configured to use a scheduling-based resource allocation manner (that is, a resource allocation mode 1).

Optionally, the base station configures at least one of the fourth parameter, the fifth parameter, or the third parameter for a QoS flow only when the QoS flow is configured to use a scheduling-based resource allocation manner (that is, a resource allocation mode 1) and is mapped to unicast transmission and/or multicast transmission.

Optionally, in this embodiment of this application, for configuring the QoS flow to use the scheduling-based resource allocation manner, refer to the foregoing subcase 16. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Fourteenth condition: The fourteenth condition is that the terminal device has the first uplink grant, the third parameter corresponding to the identifier of the QoS flow associated with the first logical channel exists, and a value of the third parameter indicates that the SR is allowed to be triggered when the first uplink grant is available for the logical channel of the sidelink radio bearer mapped to the identifier of the QoS flow; or the fourteenth condition is that the terminal device has the first uplink grant, and the first regular SL BSR is not triggered because there is data transmission on a logical channel of a sidelink radio bearer configured with the third parameter, where a value of the third parameter indicates that an SR cannot be triggered when the first uplink grant is available; or the fourteenth condition is that the terminal device has the first uplink grant and the third parameter corresponding to the identifier of the QoS flow associated with the first logical channel exists.

Sixteenth condition: The sixteenth condition is that the terminal device has the second uplink grant, but the second uplink grant does not meet any one of the following conditions:

condition m, where condition m is that the fourth parameter corresponding to the identifier of the QoS flow associated with the first logical channel exists, but a subcarrier spacing associated with the second uplink grant is not included in a value set of the fourth parameter; and condition n, where condition n is that the fifth parameter corresponding to the identifier of the QoS flow associated with the first logical channel exists, but a PUSCH duration associated with the second uplink grant is greater than a value of the fifth parameter.

Subcase 18: The one or more configuration parameters corresponding to the first identifier (that is, the identifier of the QoS flow) include at least one of the following parameters.

Sixth parameter: The sixth parameter is used to indicate an identifier of a second logical channel to which a logical channel of the sidelink radio bearer mapped to the identifier of the QoS flow is mapped, and the second logical channel is a logical channel of an uplink radio bearer. A configuration of the logical channel of the uplink radio bearer includes one or more of the following parameters used in an LCP process:

a list of subcarrier spacings to which an uplink MAC SDU of the logical channel of the uplink radio bearer can be mapped;

a maximum PUSCH duration of an uplink grant that can be used by the uplink MAC SDU of the logical channel of the uplink radio bearer;

whether the uplink MAC SDU of the logical channel of the uplink radio bearer can use a configuration grant of Type 1; and a serving cell list to which the uplink MAC SDU of the logical channel of the uplink radio bearer can be mapped.

Third parameter: The third parameter is used to indicate whether the SR is allowed to be triggered when there is a first uplink grant for the logical channel of the sidelink radio bearer mapped to the identifier of the QoS flow, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the logical channel of the sidelink radio bearer mapped to the identifier of the QoS flow, and not configuring the third parameter represents that the SR is not allowed to be triggered when the first uplink grant is available for the logical channel of the sidelink radio bearer mapped to the identifier of the QoS flow. This is not specifically limited herein.

Optionally, the base station configures at least one of the sixth parameter or the third parameter for a QoS flow only when the QoS flow is configured to use a scheduling-based resource allocation manner (that is, a resource allocation mode 1).

Optionally, the base station configures at least one of the sixth parameter or the third parameter for a QoS flow only when the QoS flow is configured to use a scheduling-based resource allocation manner (that is, a resource allocation mode 1) and is mapped to unicast transmission and/or multicast transmission.

Optionally, in this embodiment of this application, for configuring the QoS flow to use the scheduling-based resource allocation manner, refer to the foregoing subcase 16. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Fourteenth condition: The fourteenth condition is that the terminal device has the first uplink grant, the third parameter corresponding to the identifier of the QoS flow associated with the first logical channel exists, and a value of the third parameter indicates that the SR is allowed to be triggered when the first uplink grant is available for the logical channel of the sidelink radio bearer mapped to the identifier of the QoS flow; or the fourteenth condition is that the terminal device has the first uplink grant, and the first regular SL BSR is not triggered because there is data transmission on a logical channel of a sidelink radio bearer configured with the third parameter, where a value of the third parameter indicates that an SR cannot be triggered when the first uplink grant is available; or the fourteenth condition is that the terminal device has the first uplink grant and the third parameter corresponding to the identifier of the QoS flow associated with the first logical channel exists.

Seventeenth condition: The seventeenth condition is that the terminal device has the second uplink grant, and there is the sixth parameter corresponding to the identifier of the QoS flow associated with the first logical channel, but the second uplink grant does not meet an LCP mapping restriction configured for the second logical channel to which the first logical channel is mapped. Herein, for related descriptions about that the second uplink grant does not meet an LCP mapping restriction configured for the second logical channel to which the first logical channel is mapped, refer to descriptions about that the uplink grant does not meet the LCP mapping restrictions configured for the uplink logical channel in section 5.4.3.1 in 3GPP TS 38.321, details are not described herein.

Subcase 19: The one or more configuration parameters corresponding to the first identifier (that is, the identifier of the QoS flow) include the following seventh parameter.

Seventh parameter: The seventh parameter is used to indicate whether the SR is allowed to be triggered when there is a second uplink grant for the logical channel of the sidelink radio bearer mapped to the identifier of the QoS flow, and the second uplink grant is an uplink grant used for new data transmission. For example, the seventh parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the seventh parameter may represent that the SR is allowed to be triggered when the second uplink grant is available for the logical channel of the sidelink radio bearer mapped to the identifier of the QoS flow, and not configuring the seventh parameter represents that the SR is not allowed to be triggered when the second uplink grant is available for the logical channel of the sidelink radio bearer mapped to the identifier of the QoS flow. This is not specifically limited herein.

Optionally, the base station configures the seventh parameter for a QoS flow only when the QoS flow is configured to use a scheduling-based resource allocation manner (that is, a resource allocation mode 1).

Optionally, the base station configures the seventh parameter for a QoS flow only when the QoS flow is configured to use a scheduling-based resource allocation manner (that is, a resource allocation mode 1) and is mapped to unicast transmission and/or multicast transmission.

Optionally, in this embodiment of this application, for configuring the QoS flow to use the scheduling-based resource allocation manner, refer to the foregoing subcase 16. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Eighteenth condition: The eighteenth condition is that the terminal device has the second uplink grant, the seventh parameter corresponding to the identifier of the QoS flow associated with the first logical channel exists, and a value of the seventh parameter indicates that the SR is allowed to be triggered when the second uplink grant is available for the logical channel of the sidelink radio bearer mapped to the identifier of the QoS flow; or the eighteenth condition is that the terminal device has the first uplink grant, and the first regular SL BSR is not triggered because there is data transmission on a logical channel of a sidelink radio bearer configured with the seventh parameter, where a value of the seventh parameter indicates that an SR cannot be triggered when the second uplink grant is available; or the eighteenth condition is that the terminal device has the second uplink grant and the seventh parameter corresponding to the identifier of the QoS flow associated with the first logical channel exists.

Subcase 20: The one or more configuration parameters corresponding to the first identifier (that is, the identifier of the QoS flow) include the following eighth parameter.

Eighth parameter: The eighth parameter is a first time threshold.

Optionally, the base station configures the eighth parameter for a QoS flow only when the QoS flow is configured to use a scheduling-based resource allocation manner (that is, a resource allocation mode 1).

Optionally, the base station configures the eighth parameter for a QoS flow only when the QoS flow is configured to use a scheduling-based resource allocation manner (that is, a resource allocation mode 1) and is mapped to unicast transmission and/or multicast transmission.

Optionally, in this embodiment of this application, for configuring the QoS flow to use the scheduling-based resource allocation manner, refer to the foregoing subcase 16. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Nineteenth condition: The nineteenth condition is that the terminal device has the second uplink grant, the eighth parameter corresponding to the identifier of the QoS flow associated with the first logical channel exists, and a value of the eighth parameter is less than a time interval between a moment at which the first logical channel triggers the first regular SL BSR and a moment at which the terminal device transmits an uplink MAC PDU including an SL BSR MAC CE and a corresponding MAC subheader next time.

Case e: The first identifier is a QoS index of QoS information, that is, a parameter that is used to control SR triggering and that is associated with the QoS index of the QoS information configured by the base station for the terminal device. Herein, there may be one or more QoS indexes of QoS information. The following uses any QoS index of QoS information as an example for description. The terminal device may determine, based on the QoS index and a QoS parameter indicated/corresponding to the QoS index, a sidelink radio bearer to which the QoS index is mapped. The QoS index correspondingly indicates several QoS parameters, including but not limited to a guaranteed transmission rate, a maximum transmission rate, a delay requirement, a reliability requirement, a priority, a communication distance, and the like. This is not specifically limited herein.

In case e, optionally, the first message may further include a mapping relationship between the QoS index of the QoS information and an identifier of the sidelink radio bearer. In other words, the first message may further include an identifier of the sidelink radio bearer that has a mapping relationship with the QoS index of the QoS information.

For example, the base station sets a configuration of a sidelink radio bearer for the terminal device. The configuration of the sidelink radio bearer includes at least the QoS index of the QoS information mapped to the sidelink radio bearer and an identifier of a logical channel of the sidelink radio bearer. Optionally, the configuration of the sidelink radio bearer may further include an identifier of the sidelink radio bearer.

Alternatively, for example, the base station configures, for the terminal device, an identifier of a sidelink radio bearer mapped to the QoS index of the QoS information, and sets a configuration of the sidelink radio bearer for the terminal device. The configuration of the sidelink radio bearer includes at least an identifier of a logical channel of the sidelink radio bearer. Optionally, the configuration of the sidelink radio bearer may further include an identifier of the sidelink radio bearer.

Case e may include the following five sub-cases:

Subcase 21: The one or more configuration parameters corresponding to the first identifier (that is, the QoS index of the QoS information) include at least one of the following parameters.

First parameter: The first parameter is used to indicate a list of sidelink subcarrier spacings to which an SL MAC SDU from the logical channel of the sidelink radio bearer mapped to the QoS index of the QoS information can be mapped. Certainly, if the base station does not configure the first parameter for the sidelink radio bearer, the SL MAC SDU from the logical channel of the sidelink radio bearer mapped to the QoS index of the QoS information may be mapped to any configured/available sidelink subcarrier spacing.

Second parameter: The second parameter is used to indicate a maximum duration of a PSSCH grant for transmitting the SL MAC SDU that is from the logical channel of the sidelink radio bearer mapped to the QoS index of the QoS information. Certainly, if the base station does not configure the second parameter for the sidelink radio bearer mapped to the QoS index of the QoS information, a PSSCH of any duration may be used to transmit the SL MAC SDU that is from the logical channel of the sidelink radio bearer mapped to the QoS index of the QoS information.

Third parameter: The third parameter is used to indicate whether the SR is allowed to be triggered when there is a first uplink grant for the logical channel of the sidelink radio bearer mapped to the QoS index of the QoS information, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the logical channel of the sidelink radio bearer mapped to the QoS index of the QoS information, and not configuring the third parameter represents that the SR is not allowed to be triggered when the first uplink grant is available for the logical channel of the sidelink radio bearer mapped to the QoS index of the QoS information. This is not specifically limited herein.

Optionally, the base station configures at least one of the first parameter, the second parameter, or the third parameter for a QoS index of QoS information only when the QoS index of the QoS information is configured to use a scheduling-based resource allocation manner (that is, a resource allocation mode 1).

Optionally, the base station configures at least one of the first parameter, the second parameter, or the third parameter for a QoS index of the QoS information only when the QoS index of the QoS information is configured to use a scheduling-based resource allocation manner (that is, a resource allocation mode 1) and is mapped to unicast transmission and/or multicast transmission.

Optionally, in this embodiment of this application, configuring the QoS index of the QoS information to use the scheduling-based resource allocation manner includes the following two manners:

Manner 1: The base station configures, for the terminal device, whether to use the scheduling-based resource allocation manner. If the base station configures the scheduling-based resource allocation manner for the terminal device, it means that all QoS indexes of QoS information of the terminal device use the scheduling-based resource allocation manner.

Manner 2: The base station configures, for each QoS index of QoS information of the terminal device, whether to use the scheduling-based resource allocation manner.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Fourteenth condition: The fourteenth condition is that the terminal device has the first uplink grant, the third parameter corresponding to the QoS index of the QoS information associated with the first logical channel exists, and a value of the third parameter indicates that the SR is allowed to be triggered when the first uplink grant is available for the logical channel of the sidelink radio bearer mapped to the QoS index of the QoS information; or the fourteenth condition is that the terminal device has the first uplink grant, and the first regular SL BSR is not triggered because there is data transmission on a logical channel of a sidelink radio bearer configured with the third parameter, where a value of the third parameter indicates that an SR cannot be triggered when the first uplink grant is available; or the fourteenth condition is that the terminal device has the first uplink grant and the third parameter corresponding to the QoS index of the QoS information associated with the first logical channel exists.

Fifteenth condition: The fifteenth condition is that the terminal device has the second uplink grant, but the second uplink grant does not meet any one of the following conditions:

condition i, where condition i is that the first parameter corresponding to the QoS index of the QoS information associated with the first logical channel exists, but a subcarrier spacing associated with the second uplink grant is not included in a value set of the first parameter; and condition j, where condition j is that the second parameter corresponding to the QoS index of the QoS information associated with the first logical channel exists, but a PUSCH duration associated with the second uplink grant is greater than a value of the second parameter.

Subcase 22: The one or more configuration parameters corresponding to the first identifier (that is, the QoS index of the QoS information) include at least one of the following parameters.

Fourth parameter: The fourth parameter is used to indicate a list of uplink subcarrier spacings to which the logical channel of the sidelink radio bearer mapped to the QoS index of the QoS information is mapped. Certainly, if the base station does not configure the fourth parameter for the sidelink radio bearer, the logical channel of the sidelink radio bearer mapped to the QoS index of the QoS information may be mapped to any configured/available uplink subcarrier spacing.

Fifth parameter: The fifth parameter is used to indicate a maximum duration of an uplink grant to which the logical channel of the sidelink radio bearer mapped to the QoS index of the QoS information is mapped. Certainly, if the base station does not configure the fifth parameter for the sidelink radio bearer mapped to the QoS index of the QoS information, a duration of the uplink grant mapped to the logical channel of the sidelink radio bearer mapped to the QoS index of the QoS information may be any value.

Third parameter: The third parameter is used to indicate whether the SR is allowed to be triggered when there is a first uplink grant for the logical channel of the sidelink radio bearer mapped to the QoS index of the QoS information, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the logical channel of the sidelink radio bearer mapped to the QoS index of the QoS information, and not configuring the third parameter represents that the SR is not allowed to be triggered when the first uplink grant is available for the logical channel of the sidelink radio bearer mapped to the QoS index of the QoS information. This is not specifically limited herein.

Optionally, the base station configures at least one of the fourth parameter, the fifth parameter, or the third parameter for a QoS index of QoS information only when the QoS index of the QoS information is configured to use a scheduling-based resource allocation manner (that is, a resource allocation mode 1).

Optionally, the base station configures at least one of the fourth parameter, the fifth parameter, or the third parameter for a QoS index of QoS information only when the QoS index of the QoS information is configured to use a scheduling-based resource allocation manner (that is, a resource allocation mode 1) and is mapped to unicast transmission and/or multicast transmission.

Optionally, in this embodiment of this application, for configuring the QoS index of the QoS information to use the scheduling-based resource allocation manner, refer to the foregoing subcase 21. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Fourteenth condition: The fourteenth condition is that the terminal device has the first uplink grant, the third parameter corresponding to the QoS index of the QoS information associated with the first logical channel exists, and a value of the third parameter indicates that the SR is allowed to be triggered when the first uplink grant is available for the logical channel of the sidelink radio bearer mapped to the QoS index of the QoS information; or the fourteenth condition is that the terminal device has the first uplink grant, and the first regular SL BSR is not triggered because there is data transmission on a logical channel of a sidelink radio bearer configured with the third parameter, where a value of the third parameter indicates that an SR cannot be triggered when the first uplink grant is available; or the fourteenth condition is that the terminal device has the first uplink grant and the third parameter corresponding to the QoS index of the QoS information associated with the first logical channel exists.

Sixteenth condition: The sixteenth condition is that the terminal device has the second uplink grant, but the second uplink grant does not meet any one of the following conditions:

condition m, where condition m is that the fourth parameter corresponding to the QoS index of the QoS information associated with the first logical channel exists, but a subcarrier spacing associated with the second uplink grant is not included in a value set of the fourth parameter; and condition n, where condition n is that the fifth parameter corresponding to the QoS index of the QoS information associated with the first logical channel exists, but a PUSCH duration associated with the second uplink grant is greater than a value of the fifth parameter.

Subcase 23: The one or more configuration parameters corresponding to the first identifier (that is, the QoS index of the QoS information) include at least one of the following parameters.

Sixth parameter: The sixth parameter is used to indicate an identifier of a second logical channel to which a logical channel of the sidelink radio bearer mapped to the QoS index of the QoS information is mapped, and the second logical channel is a logical channel of an uplink radio bearer. A configuration of the logical channel of the uplink radio bearer includes one or more of the following parameters used in an LCP process:

a list of subcarrier spacings to which an uplink MAC SDU of the logical channel of the uplink radio bearer can be mapped;

a maximum PUSCH duration of an uplink grant that can be used by the uplink MAC SDU of the logical channel of the uplink radio bearer;

whether the uplink MAC SDU of the logical channel of the uplink radio bearer can use a configuration grant of Type 1; and a serving cell list to which the uplink MAC SDU of the logical channel of the uplink radio bearer can be mapped.

Third parameter: The third parameter is used to indicate whether the SR is allowed to be triggered when there is a first uplink grant for the logical channel of the sidelink radio bearer mapped to the QoS index of the QoS information, and the first uplink grant is a configured uplink grant. For example, the third parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the third parameter may represent that the SR is allowed to be triggered when the first uplink grant is available for the logical channel of the sidelink radio bearer mapped to the QoS index of the QoS information, and not configuring the third parameter represents that the SR is not allowed to be triggered when the first uplink grant is available for the logical channel of the sidelink radio bearer mapped to the QoS index of the QoS information. This is not specifically limited herein.

Optionally, the base station configures at least one of the sixth parameter or the third parameter for a QoS index of QoS information only when the QoS index of the QoS information is configured to use a scheduling-based resource allocation manner (that is, a resource allocation mode 1).

Optionally, the base station configures at least one of the sixth parameter or the third parameter for a QoS index of QoS information only when the QoS index of the QoS information is configured to use a scheduling-based resource allocation manner (that is, a resource allocation mode 1) and is mapped to unicast transmission and/or multicast transmission.

Optionally, in this embodiment of this application, for configuring the QoS index of the QoS information to use the scheduling-based resource allocation manner, refer to the foregoing subcase 21. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Fourteenth condition: The fourteenth condition is that the terminal device has the first uplink grant, the third parameter corresponding to the QoS index of the QoS information associated with the first logical channel exists, and a value of the third parameter indicates that the SR is allowed to be triggered when the first uplink grant is available for the logical channel of the sidelink radio bearer mapped to the QoS index of the QoS information; or the fourteenth condition is that the terminal device has the first uplink grant, and the first regular SL BSR is not triggered because there is data transmission on a logical channel of a sidelink radio bearer configured with the third parameter, where a value of the third parameter indicates that an SR cannot be triggered when the first uplink grant is available; or the fourteenth condition is that the terminal device has the first uplink grant and the third parameter corresponding to the QoS index of the QoS information associated with the first logical channel exists.

Seventeenth condition: The seventeenth condition is that the terminal device has the second uplink grant, and there is the sixth parameter corresponding to the QoS index of the QoS information associated with the first logical channel, but the second uplink grant does not meet an LCP mapping restriction configured for the second logical channel to which the first logical channel is mapped. Herein, for related descriptions about that the second uplink grant does not meet an LCP mapping restriction configured for the second logical channel to which the first logical channel is mapped, refer to descriptions about that the uplink grant does not meet the LCP mapping restrictions configured for the uplink logical channel in section 5.4.3.1 in 3GPP TS 38.321, details are not described herein.

Subcase 24: The one or more configuration parameters corresponding to the first identifier (that is, the QoS index of the QoS information) include the following seventh parameter.

Seventh parameter: The seventh parameter is used to indicate whether the SR is allowed to be triggered when there is a second uplink grant for the logical channel of the sidelink radio bearer mapped to the QoS index of the QoS information, and the second uplink grant is an uplink grant used for new data transmission. For example, the seventh parameter is represented by using one bit. A bit value "1" indicates that the SR is allowed to be triggered, and a bit value "0" indicates that the SR is not allowed to be triggered. Alternatively, a bit value "0" indicates that the SR is allowed to be triggered, and a bit value "1" indicates that the SR is not allowed to be triggered.

Certainly, alternatively, configuring the seventh parameter may represent that the SR is allowed to be triggered when the second uplink grant is available for the logical channel of the sidelink radio bearer mapped to the QoS index of the QoS information, and not configuring the seventh parameter represents that the SR is not allowed to be triggered when the second uplink grant is available for the logical channel of the sidelink radio bearer mapped to the QoS index of the QoS information. This is not specifically limited herein.

Optionally, the base station configures the seventh parameter for a QoS index of QoS information only when the QoS index of the QoS information is configured to use a scheduling-based resource allocation manner (that is, a resource allocation mode 1).

Optionally, the base station configures the seventh parameter for a QoS index of QoS information only when the QoS index of the QoS information is configured to use a scheduling-based resource allocation manner (that is, a resource allocation mode 1) and is mapped to unicast transmission and/or multicast transmission.

Optionally, in this embodiment of this application, for configuring the QoS index of the QoS information to use the scheduling-based resource allocation manner, refer to the foregoing subcase 21. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Eighteenth condition: The eighteenth condition is that the terminal device has the second uplink grant, the seventh parameter corresponding to the QoS index of the QoS information associated with the first logical channel exists, and a value of the seventh parameter indicates that the SR is allowed to be triggered when the second uplink grant is available for the logical channel of the sidelink radio bearer mapped to the QoS index of the QoS information; or the eighteenth condition is that the terminal device has the first uplink grant, and the first regular SL BSR is not triggered because there is data transmission on a logical channel of a sidelink radio bearer configured with the seventh parameter, where a value of the seventh parameter indicates that an SR cannot be triggered when the second uplink grant is available; or the eighteenth condition is that the terminal device has the second uplink grant and the seventh parameter corresponding to the QoS index of the QoS information associated with the first logical channel exists.

Subcase 25: The one or more configuration parameters corresponding to the first identifier (that is, the QoS index of the QoS information) include the following eighth parameter.

Eighth parameter: The eighth parameter is a first time threshold.

Optionally, the base station configures the eighth parameter for a QoS index of QoS information only when the QoS index of the QoS information is configured to use a scheduling-based resource allocation manner (that is, a resource allocation mode 1).

Optionally, the base station configures the eighth parameter for a QoS index of QoS information only when the QoS index of the QoS information is configured to use a scheduling-based resource allocation manner (that is, a resource allocation mode 1) and is mapped to unicast transmission and/or multicast transmission.

Optionally, in this embodiment of this application, for configuring the QoS index of the QoS information to use the scheduling-based resource allocation manner, refer to the foregoing subcase 21. Details are not described herein again.

On the terminal device side, if the first logical channel triggers the first SL BSR and the first SL BSR has not been canceled, the terminal device triggers the SR based on the first identifier and the one or more configuration parameters corresponding to the first identifier when any one of the following conditions is met.

First condition: The first condition is that the terminal device does not have a second uplink grant, and the second uplink grant is an uplink grant used for new data transmission. Optionally, the second uplink grant may include a configured uplink grant and a dynamically scheduled uplink grant.

Nineteenth condition: The nineteenth condition is that the terminal device has the second uplink grant, the eighth parameter corresponding to the QoS index of the QoS information associated with the first logical channel exists, and a value of the eighth parameter is less than a time interval between a moment at which the first logical channel triggers the first regular SL BSR and a moment at which the terminal device transmits an uplink MAC PDU including an SL BSR MAC CE and a corresponding MAC subheader next time.

According to the method for triggering an SR in this embodiment of this application, QoS requirements of different services in an NR V2X system can be met, and unnecessary SR triggering can be avoided or reduced.

The processor 301 in the network device 30 shown in FIG. 3 may invoke application program code stored in the memory 302, to instruct the network device to perform the actions of the base station in steps S501 to S502. The processor 401 in the terminal device 40 shown in FIG. 3 may invoke application program code stored in the memory 402, to instruct the network device to perform the actions of the terminal device in steps S501 to S502. This is not limited in this embodiment.

The foregoing mainly describes the solutions provided in the embodiments of this application from a perspective of interaction between network elements. Correspondingly, an embodiment of this application further provides a communications apparatus, and the communications apparatus is configured to implement the foregoing methods. The communications apparatus may be the terminal device in the foregoing method embodiments, or an apparatus including the foregoing terminal device, or a component that can be used for the terminal device. It can be understood that, to implement the foregoing functions, the communications apparatus includes a corresponding hardware structure and/ or software module for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, the communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. During actual implementation, another division manner may be used.

Figure 6:
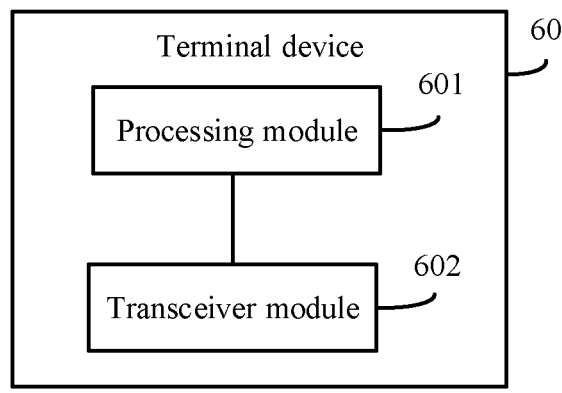
FIG. 6 is still another schematic structural diagram of a terminal device according to an embodiment of this application.

For example, the communications apparatus is the terminal device in the foregoing method embodiments. FIG. 6 is a schematic structural diagram of a terminal device 60. The terminal device 60 includes a processing module 601 and a transceiver module 602. The transceiver module 602 may also be referred to as a transceiver unit, and is configured to implement a transceiver function. For example, the transceiver module 602 may be a transceiver circuit, a transceiver, or a communications interface.

The transceiver module 602 is configured to receive a first message from a network device, where the first message includes a first identifier and one or more configuration parameters corresponding to the first identifier; the first identifier is an identifier of a first logical channel, or there is a mapping relationship between the first identifier and the first logical channel; and the first logical channel is a logical channel of a sidelink radio bearer. The processing module 601 is configured to: if the first logical channel triggers a first regular sidelink buffer status report SL BSR and the first regular SL BSR has not been canceled, trigger an SR based on the first identifier and the one or more configuration parameters corresponding to the first identifier.

All related content of the steps in the foregoing method embodiments may be cited in function descriptions of corresponding function modules. Details are not described herein again.

In this embodiment, the terminal device 60 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the terminal device 60 may be in a form of the terminal device 30 shown in FIG. 2.

For example, the processor 401 in the terminal device 40 shown in FIG. 3 may invoke computer-executable instructions stored in the memory 402, so that the terminal device 40 performs the method for triggering an SR in the foregoing method embodiments.

Specifically, the processor 401 in the terminal device 40 shown in FIG. 3 may invoke the computer-executable instructions stored in the memory 402, to implement functions/implementation processes of the processing module 601 and the transceiver module 602 in FIG. 6. Alternatively, the processor 401 in the terminal device 40 shown in FIG. 3 may invoke the computer-executable instructions stored in the memory 402, to implement functions/implementation processes of the processing module 601 in FIG. 6, and the transceiver 403 in the terminal device 40 shown in FIG. 3 may implement functions/implementation processes of the transceiver module 602 in FIG. 6.

The terminal device 60 provided in this embodiment can perform the foregoing method for triggering an SR. Therefore, for a technical effect that can be achieved by the terminal device 60, refer to the foregoing method embodiments. Details are not described herein again.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store a necessary program instruction and necessary data. The processor may invoke program code stored in the memory, to indicate the communications apparatus to perform the method in any one of the foregoing method embodiments. Certainly, the communications apparatus may not include a memory. When the communications apparatus is a chip system, the communications apparatus may include a chip, or may include a chip and another discrete component. This is not specifically limited in this embodiment of this application.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium, or may be transmitted from one computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "including" (including) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application, provided that they fall within the scope of protection defined by the following claims and their equivalent technologies in this application.

The invention claimed is:

1. A method comprising:
receiving, from a network device, a first message comprising a first identifier, source information associated with the first identifier, destination information associated with the first identifier, and one or more configuration parameters corresponding to the first identifier, wherein either the first identifier is an identifier of a first logical channel or there is a first mapping relationship between the first identifier and the first logical channel, wherein the first logical channel is a logical channel of a sidelink (SL) radio bearer, and wherein the one or more configuration parameters comprise a first parameter and a second parameter; and
triggering a scheduling request (SR) based on the first identifier, the first parameter, the second parameter, the source information, and the destination information when the first logical channel has triggered a first regular SL buffer status report (BSR) and when the first regular SL BSR has not been canceled,
wherein the first parameter indicates a list of uplink subcarrier spacings to which the first logical channel has been mapped, and
wherein the second parameter indicates a maximum duration of an uplink grant to which the first logical channel has been mapped.

2. The method of claim 1, further comprising further triggering the SR when one of the following conditions is met:
a first condition indicating that a terminal device does not have a second uplink grant used for new data transmission;
a second condition indicating that the terminal device has a first uplink grant, a third parameter exists, and a value of the third parameter indicates that the SR is allowed to be triggered when the first uplink grant is available for the first logical channel, wherein the first uplink grant is a configured uplink grant; or
a third condition indicating that the terminal device has the second uplink grant and the second uplink grant does not meet one of the following conditions:
the first parameter exists and a subcarrier spacing associated with the second uplink grant is not comprised in a value set of the first parameter; or
the second parameter exists and a physical uplink shared channel (PUSCH) duration associated with the second uplink grant is greater than a value of the second parameter.

3. The method of claim 1, wherein the first identifier is of:
the SL radio bearer;
a quality of service (QoS) flow to which the SL radio bearer has been mapped; or
a QoS index of QoS information associated with the SL radio bearer.

4. The method of claim 1, wherein there is a second mapping relationship between the first identifier and a second identifier of the first logical channel, wherein the first message further comprises or indicates the second mapping relationship.

5. A communications device for triggering a scheduling request (SR) comprising:
a transceiver configured to receive, from a network device, a first message comprising a first identifier, source information associated with the first identifier, destination information associated with the first identifier, and one or more configuration parameters corresponding to the first identifier, wherein either the first identifier is an identifier of a first logical channel or there is a first mapping relationship between the first identifier and the first logical channel, wherein the first logical channel is a logical channel of a sidelink (SL) radio bearer, and wherein the one or more configuration parameters comprise a first parameter and a second parameter; and
a processor coupled to the transceiver and configured to trigger the SR based on the first identifier, the first parameter, the second parameter, the source information, and the destination information when the first logical channel has triggered a first regular SL buffer status report (BSR) and when the first regular SL BSR has not been canceled,
wherein the first parameter indicates a list of uplink subcarrier spacings to which the first logical channel has been mapped, and
wherein the second parameter indicates a maximum duration of an uplink grant to which the first logical channel has been mapped.

6. The communications device of claim 5, wherein the processor is further configured to further trigger the SR when one of the following conditions is met:
a first condition indicating that the communications device does not have a second uplink grant used for new data transmission;
a second condition indicating that the terminal device has a first uplink grant, a third parameter exists, and a value of the third parameter indicates that the SR is allowed to be triggered when the first uplink grant is available for the first logical channel, wherein the first uplink grant is a configured uplink grant; or
a third condition indicating that the communications device has the second uplink grant and the second uplink grant does not meet one of the following conditions:
the first parameter exists and a subcarrier spacing associated with the second uplink grant is not comprised in a value set of the first parameter; or
the second parameter exists and a physical uplink shared channel (PUSCH) duration associated with the second uplink grant is greater than a value of the second parameter.

7. The communications device of claim 5, wherein the first identifier is of:
- the SL radio bearer;
- a quality of service (QoS) flow to which the SL radio bearer has been mapped; or
- a QoS index of QoS information associated with the SL radio bearer.

8. The communications device of claim 5, wherein there is a second mapping relationship between the first identifier and a second identifier of the first logical channel, and wherein the first message further comprises or indicates the second mapping relationship.

9. A computer program product comprising computer-executable instructions stored on a non-transitory computer-readable medium that, when executed by a processor, cause a terminal device to:
- receive, from a network device, a first message comprising a first identifier, source information associated with the first identifier, destination information associated with the first identifier, and one or more configuration parameters corresponding to the first identifier, wherein either the first identifier is an identifier of a first logical channel, or there is a mapping relationship between the first identifier and the first logical channel, wherein the first logical channel is a logical channel of a sidelink (SL) radio bearer, and wherein the one or more configuration parameters comprise a first parameter and a second parameter; and
- trigger a scheduling request (SR) based on the first identifier, the first parameter, the second parameter, the source information, and the destination information when the first logical channel has triggered a first regular SL buffer status report (BSR) and when the first regular SL BSR has not been canceled,
- wherein the first parameter indicates a list of uplink subcarrier spacings to which the first logical channel has been mapped, and
- wherein the second parameter indicates a maximum duration of an uplink grant to which the first logical channel has been mapped.

10. The computer program product of claim 9, wherein the computer-executable instructions further cause the terminal device to further trigger the SR when one of the following conditions is met:
- a first condition indicating that the terminal device does not have a second uplink grant used for new data transmission;
- a second condition indicating that the terminal device has a first uplink grant, a third parameter exists, and a value of the third parameter indicates that the SR is allowed to be triggered when the first uplink grant is available for the first logical channel, wherein the first uplink grant is a configured uplink grant; or
- a third condition indicating that the terminal device has the second uplink grant and the second uplink grant does not meet one of the following conditions:
  - the first parameter exists and a subcarrier spacing associated with the second uplink grant is not comprised in a value set of the first parameter; or
  - the second parameter exists and a physical uplink shared channel (PUSCH) duration associated with the second uplink grant is greater than a value of the second parameter.

11. The computer program product of claim 9, wherein the first identifier is of:
- the SL radio bearer;
- a quality of service (QoS) flow to which the SL radio bearer has been mapped; or
- a QoS index of QoS information associated with the SL radio bearer.

12. The method of claim 1, wherein the first message comprises the destination information of a vehicle to everything (V2X) service.

13. The method of claim 1, wherein the source information comprises a source layer-2 identifier.

14. The method of claim 1, wherein the source information comprises an index value mapped to a source layer-2 identifier.

15. The communications device of claim 5, wherein the first message comprises the destination information of a vehicle to everything (V2X) service.

16. The communications device of claim 5, wherein the source information comprises a source layer-2 identifier.

17. The communications device of claim 5, wherein the source information comprises an index value mapped to a source layer-2 identifier.

18. The computer program product of claim 9, wherein the first message comprises the destination information of a vehicle to everything (V2X) service.

19. The computer program product of claim 9, wherein the source information comprises a source layer-2 identifier.

20. The computer program product of claim 9, wherein the source information comprises an index value mapped to a source layer-2 identifier.

* * * * *